(12) United States Patent
Wang

(10) Patent No.: US 11,812,275 B2
(45) Date of Patent: *Nov. 7, 2023

(54) INTELLIGENT RADIO BAND RECONFIGURATION FOR ACCESS POINTS OF A WIRELESS NETWORK

(71) Applicant: Juniper Networks, Inc., Sunnyvale, CA (US)

(72) Inventor: Wenfeng Wang, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,559

(22) Filed: Aug. 20, 2021

(65) Prior Publication Data

US 2021/0385660 A1    Dec. 9, 2021

Related U.S. Application Data

(63) Continuation of application No. 16/696,231, filed on Nov. 26, 2019, now Pat. No. 11,129,027.

(Continued)

(51) Int. Cl.
*H04W 16/10* (2009.01)
*H04B 17/318* (2015.01)
(Continued)

(52) U.S. Cl.
CPC .......... *H04W 16/10* (2013.01); *H04B 17/318* (2015.01); *H04W 16/14* (2013.01);
(Continued)

(58) Field of Classification Search
CPC ... H04W 16/10; H04W 16/14; H04W 52/243; H04W 52/245; H04W 72/082;
(Continued)

(56) References Cited

U.S. PATENT DOCUMENTS 7,616,966 B2    11/2009  Nguyen
8,681,810 B2 *   3/2014  Nandagopalan .. H04W 74/0808
                                              370/445

(Continued)

FOREIGN PATENT DOCUMENTS

| CN | 101521924 A | 9/2009 |
| CN | 107113795 A | 8/2017 |
| GB | 2495217     | 4/2013 |

OTHER PUBLICATIONS

U.S. Appl. No. 17/303,222, filed May 24, 2021, naming inventors Safavi et al.

(Continued)

*Primary Examiner* — Mewale A Ambaye
(74) *Attorney, Agent, or Firm* — Shumaker & Sieffert, P.A.

(57) ABSTRACT

Methods and apparatus for automatically reconfiguring network parameters are described. Some embodiments identify communication channels that may interfere with higher priority equipment and deactivate communication channels that may cause harmful interference. Some APs are switched to 2.4 GHz communication channels. In some embodiments, AP operating parameters, such as transmission power are adjusted to reduce interference for higher priority receivers.

18 Claims, 14 Drawing Sheets

Related U.S. Application Data

(60) Provisional application No. 62/907,889, filed on Sep. 30, 2019.

(51) Int. Cl.

| | | |
|---|---|---|
| *H04W 16/14* | (2009.01) | |
| *H04W 52/24* | (2009.01) | |
| *H04W 72/54* | (2023.01) | |
| *H04W 72/541* | (2023.01) | |
| *H04W 72/566* | (2023.01) | |

(52) U.S. Cl.
CPC ....... *H04W 52/243* (2013.01); *H04W 52/245* (2013.01); *H04W 72/54* (2023.01); *H04W 72/541* (2023.01); *H04W 72/566* (2023.01)

(58) Field of Classification Search
CPC ......... H04W 72/1226; H04W 72/1247; H04W 72/04; H04W 72/12; H04W 72/1221; H04B 17/318
See application file for complete search history.

(56) References Cited

U.S. PATENT DOCUMENTS

| | | | | |
|---|---|---|---|---|
| 9,197,528 | B2* | 11/2015 | Babiarz | ................. H04W 36/20 |
| 9,432,999 | B1 | 8/2016 | Tkach et al. | |
| 9,832,082 | B2 | 11/2017 | Dade et al. | |
| 10,862,742 | B2 | 12/2020 | Singh | |
| 10,958,537 | B2 | 3/2021 | Safavi | |
| 10,958,585 | B2 | 3/2021 | Safavi | |
| 10,985,969 | B2 | 4/2021 | Safavi | |
| 11,129,027 | B2 | 9/2021 | Wang | |
| 2001/0041594 | A1 | 11/2001 | Arazi et al. | |
| 2004/0136318 | A1 | 7/2004 | Bentley | |
| 2010/0124204 | A1* | 5/2010 | Won | ...................... H04W 36/30 370/332 |
| 2011/0099126 | A1* | 4/2011 | Belani | ...................... G08G 1/14 705/418 |
| 2011/0130149 | A1* | 6/2011 | Yao et al. | ............. H04W 36/30 370/332 |
| 2011/0250858 | A1 | 10/2011 | Jain et al. | |
| 2012/0208543 | A1 | 8/2012 | Takagi | |
| 2014/0050156 | A1 | 2/2014 | Chan et al. | |
| 2014/0219119 | A1 | 8/2014 | Ishida et al. | |
| 2015/0038148 | A1 | 2/2015 | Park et al. | |
| 2016/0174217 | A1 | 6/2016 | Salem et al. | |
| 2016/0192378 | A1 | 6/2016 | Goodson et al. | |
| 2017/0231011 | A1 | 8/2017 | Park et al. | |
| 2017/0324439 | A1 | 11/2017 | Desai et al. | |
| 2017/0325104 | A1 | 11/2017 | Desai et al. | |
| 2019/0007856 | A1 | 1/2019 | Desai | |
| 2021/0143895 | A1* | 5/2021 | Kim | ........................ H04W 4/40 |
| 2021/0194763 | A1* | 6/2021 | Abedini | .............. H04L 41/0654 |
| 2021/0306201 | A1 | 9/2021 | Wang et al. | |
| 2021/0329473 | A1* | 10/2021 | Zhang | ................... H04W 24/10 |

OTHER PUBLICATIONS

U.S. Appl. No. 17/808,467, filed Jun. 23, 2022, naming inventors Lin et al.

Notice of Intent to Grant and Text Intended to Grant from counterpart European Application No. 20182956.1 dated Feb. 9, 2022, 39 pp.

Office Action from counterpart Chinese Application No. 202010611910.9 dated Mar. 3, 2022, 4 pp.

First Office Action and Search Report, and translation thereof, from counterpart Chinese Application No. 202010611910.9 dated Nov. 8, 2021, 15 pp.

"Australian Application Serial No. 2020203981, First Examination Report dated Nov. 26, 2020", 8 pgs.

Olivier, Jeunen, "A Machine Learning Approach for IEEE 802.11 Channel Allocation", 14th International Conference on Network and Service Management (CNSM 2018), (2018), 28-36.

"European Application Serial No. 20182956.1, Extended European Search Report dated Nov. 17, 2020", 6 pgs.

Prosecution History from U.S. Appl. No. 16/696,231, dated Feb. 17, 2021 through May 27, 2021, 43 pp.

Response to Extended Search Report dated Nov. 17, 2020, from counterpart European Application No. 20182956.1, filed Sep. 30, 2021, 15 pp.

Office Action from counterpart Chinese Application No. 202010611910.9 dated Jul. 5, 2022, 3 pp.

Extended Search Report from counterpart European Application No. 22177400.3 dated Sep. 9, 2022, 8 pp.

Response to Extended Search Report dated Sep. 9, 2022, from counterpart European Application No. 22177400.3 filed Apr. 12, 2023, 7 pp.

* cited by examiner

INTELLIGENT RADIO BAND RECONFIGURATION FOR ACCESS POINTS OF A WIRELESS NETWORK

CROSS REFERENCE TO RELATED APPLICATIONS

This application is a continuation of U.S. patent application Ser. No. 16/696,231, filed Nov. 26, 2019, which claims the benefit of U.S. Provisional Patent Application No. 62/907,889, filed Sep. 30, 2019, each of which is incorporated by reference herein in its entirety.

FIELD

The present application relates to wireless communications. In particular, the disclosed subject matter improves roaming of mobile terminals from one access point to another.

Figure 1:
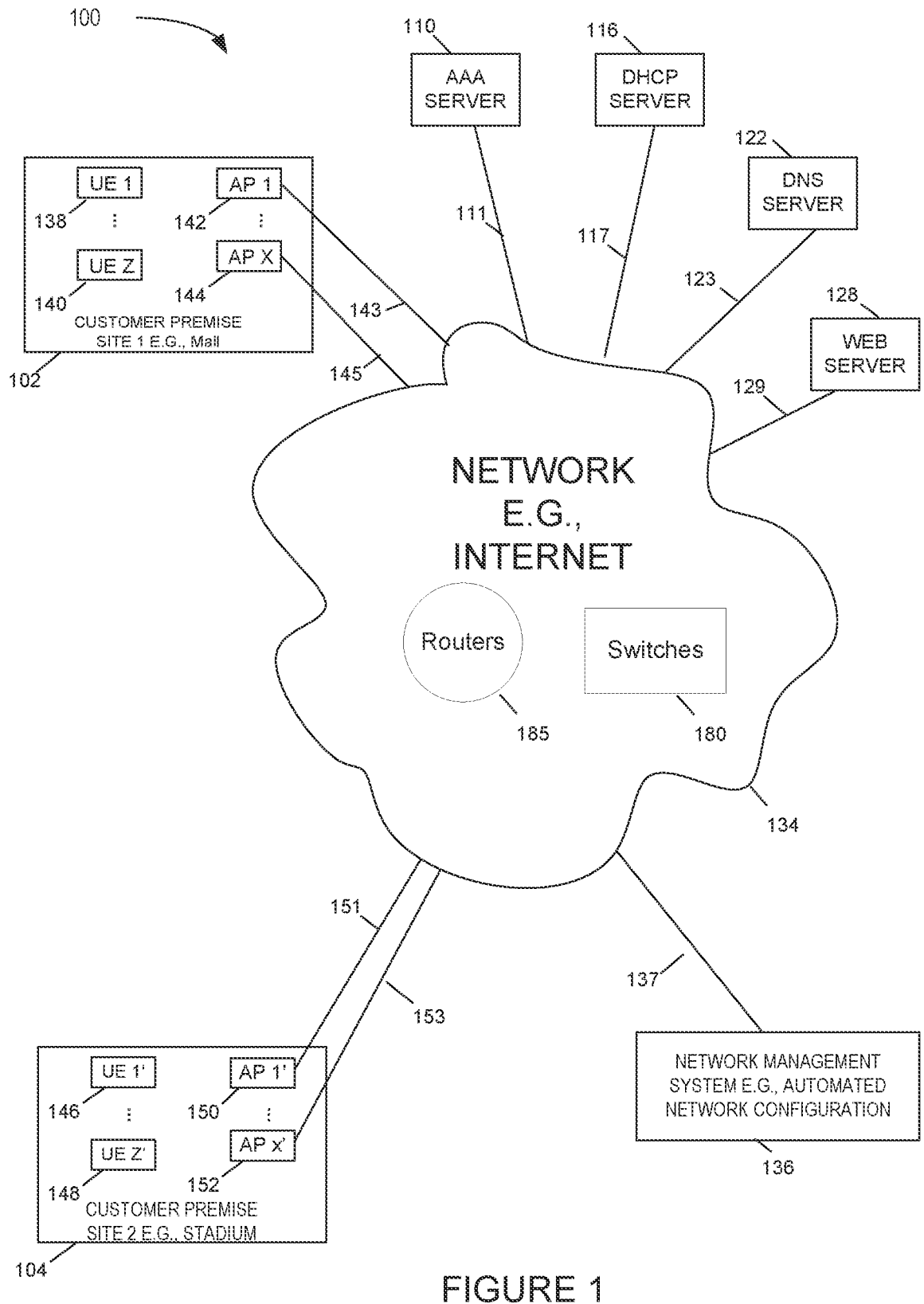
FIG. 1 is a block diagram illustrating an example communications network in which one or more embodiments are implemented.

6A illustrate an example network graph of a network such as the network of FIG. 1.

Figure 6A:
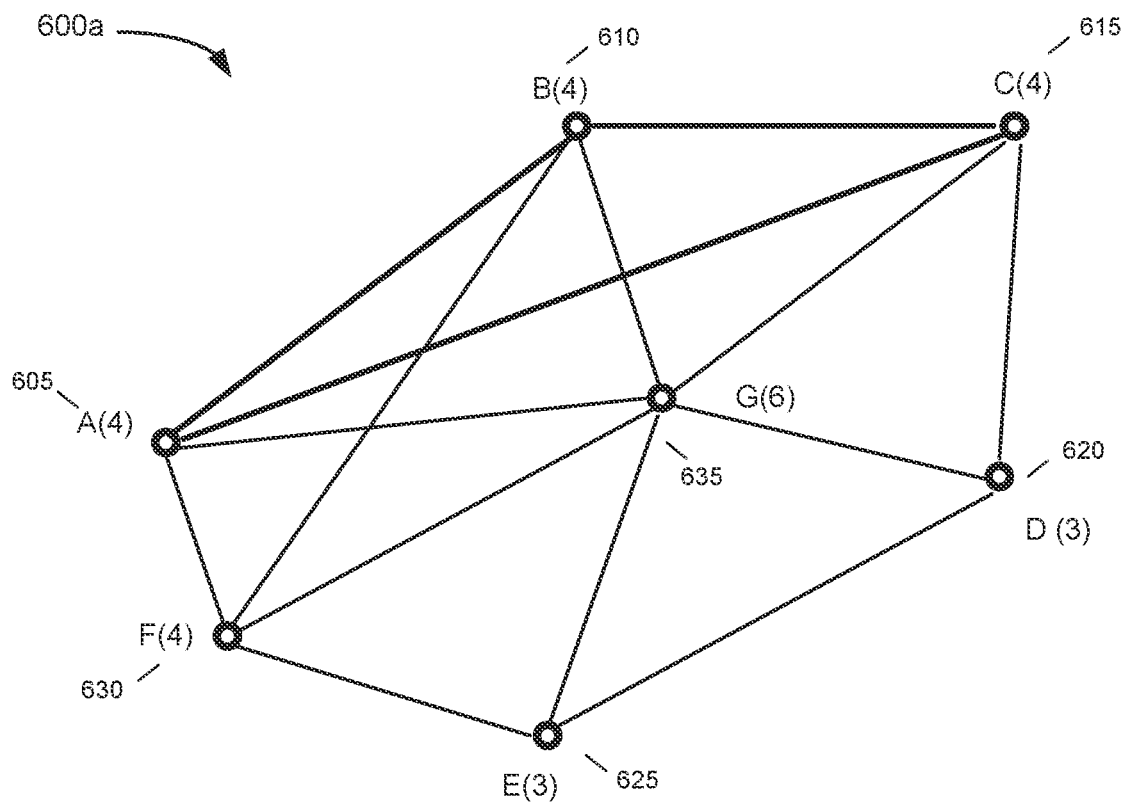
Figure 6B:
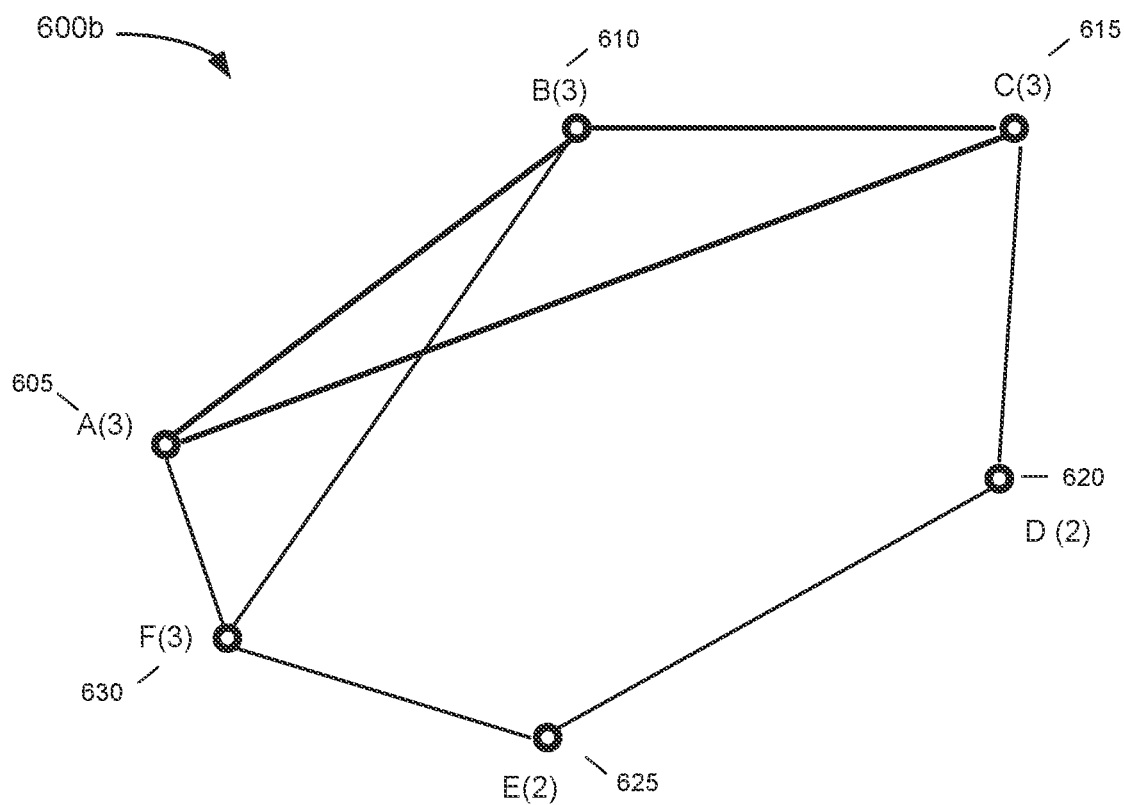

FIG. 6B is an example network graph corresponding to the network of FIG. 6A after one AP has been turned off or otherwise inhibited.

Figure 6C:
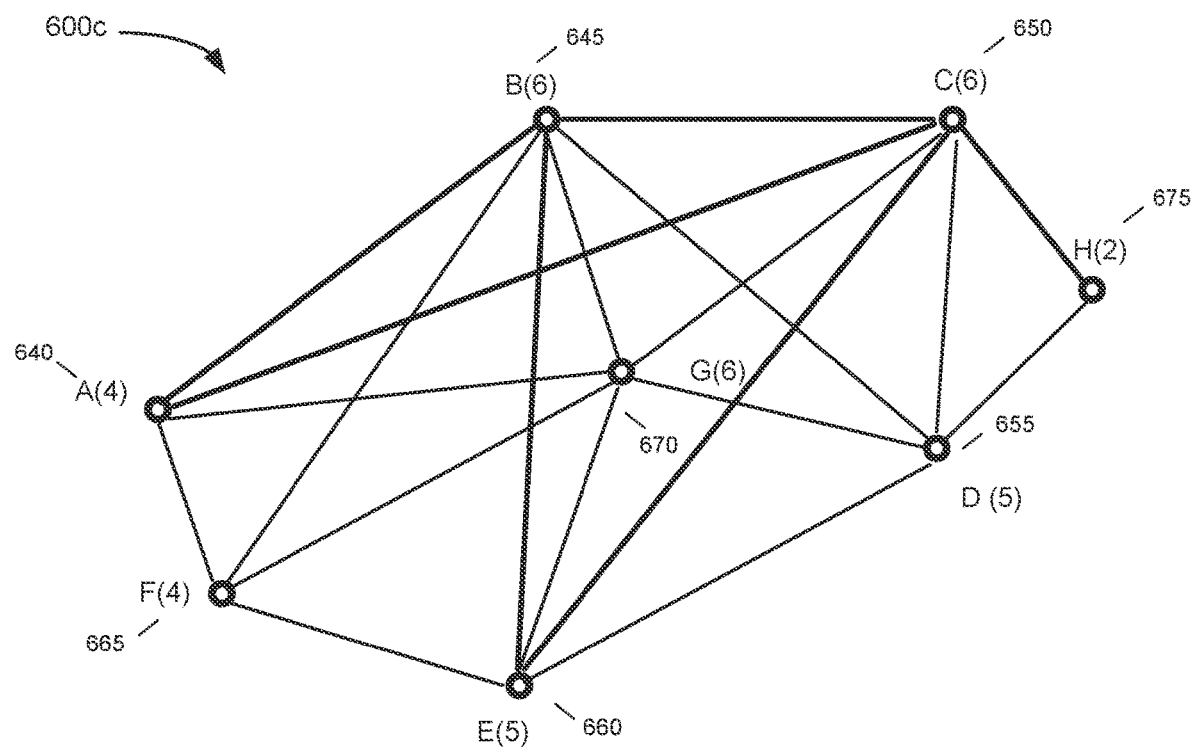

FIG. 6C is an example network graph corresponding to another network such as the system of FIG. 1.

Figure 6D:
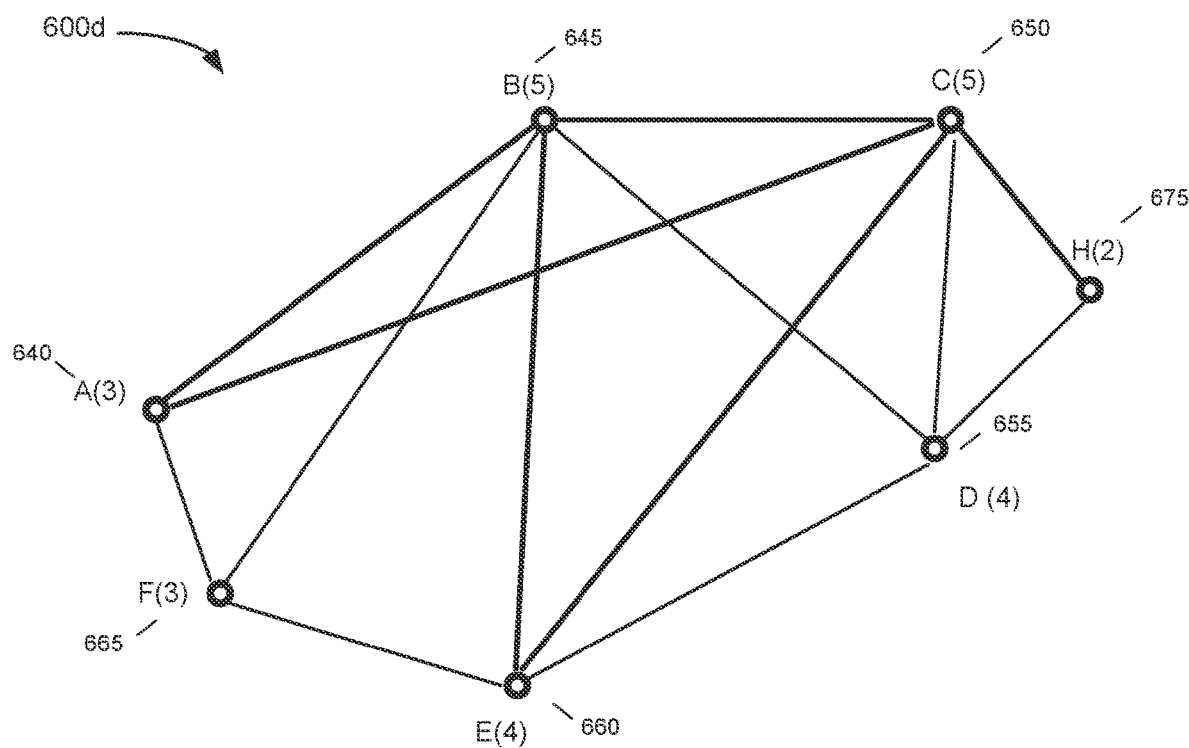
Figure 6D:
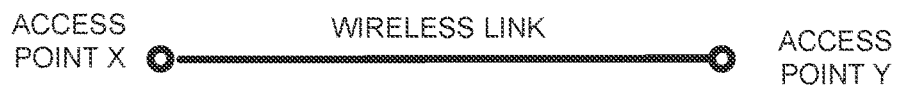

FIG. 6D is an example network graph corresponding to the network of FIG. 6C after one AP has been turned off or otherwise inhibited.

Figure 6E:
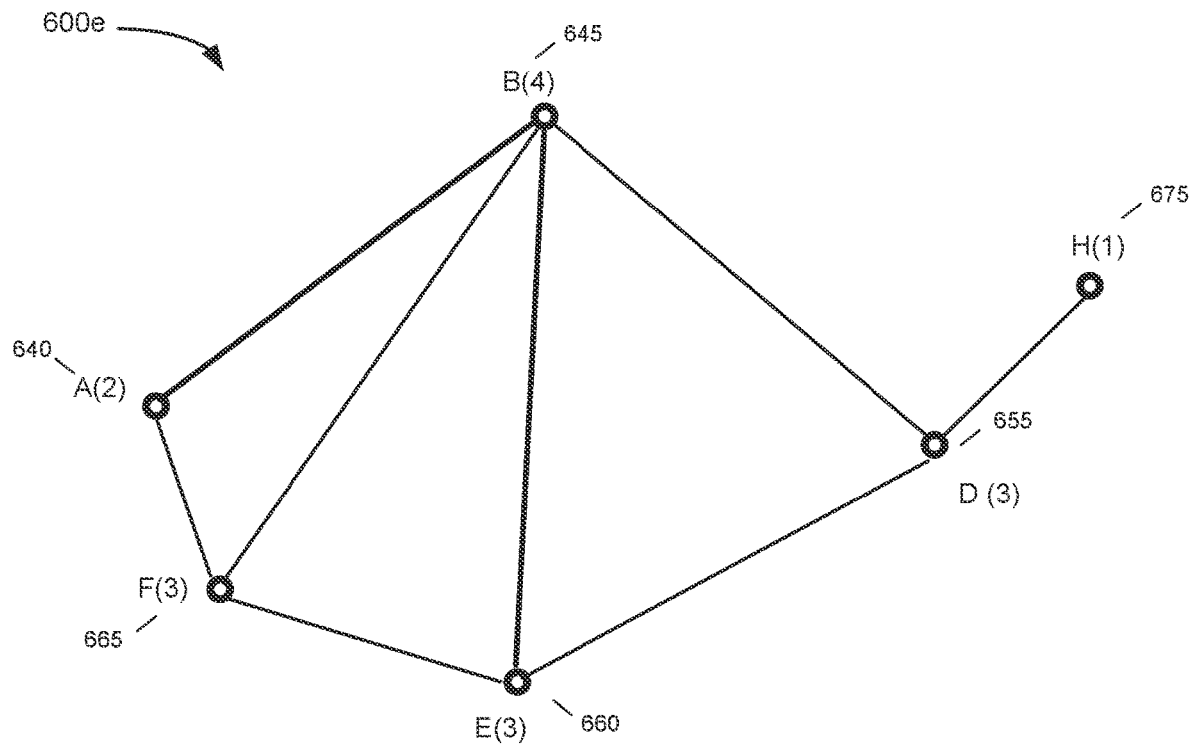

FIG. 6E is an example network graph corresponding to the network of FIG. 6C after two APs have been turned off or otherwise inhibited.

Figure 6F:
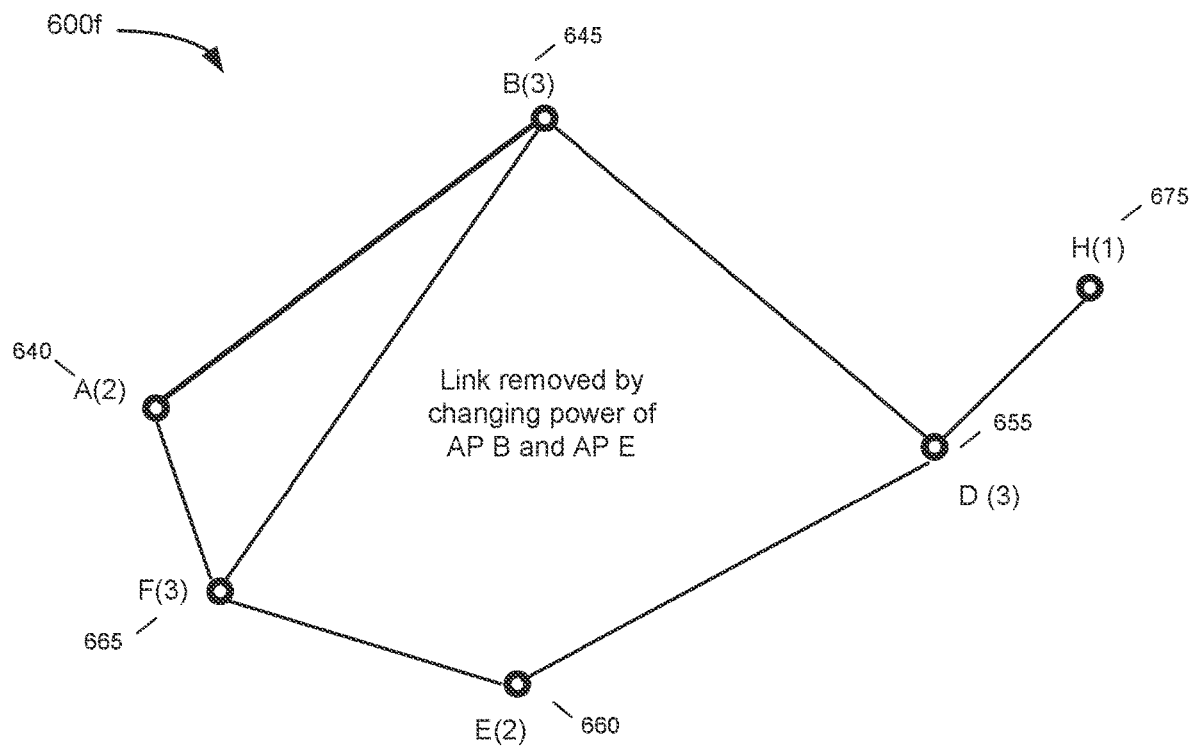

FIG. 6F is an example network graph corresponding to the network of FIG. 6C after two APs have been turned off or otherwise inhibited and the transmission power has been adjusted.

Figure 7:
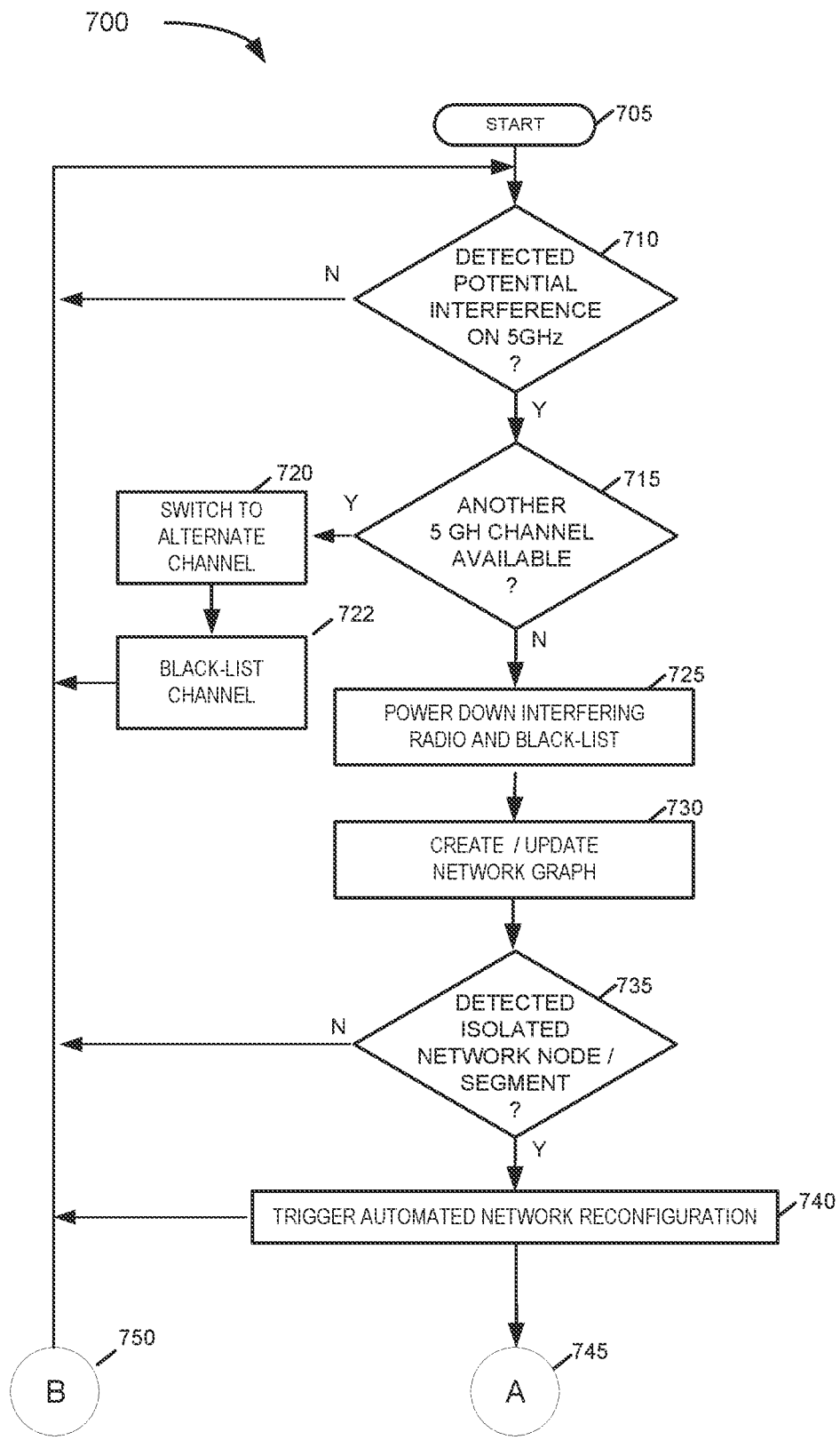

FIG. 7 is a flowchart of an example process performed by an AP using Dynamic Frequency Selection (DFS) in one or more of the disclosed embodiments.

Figure 8:
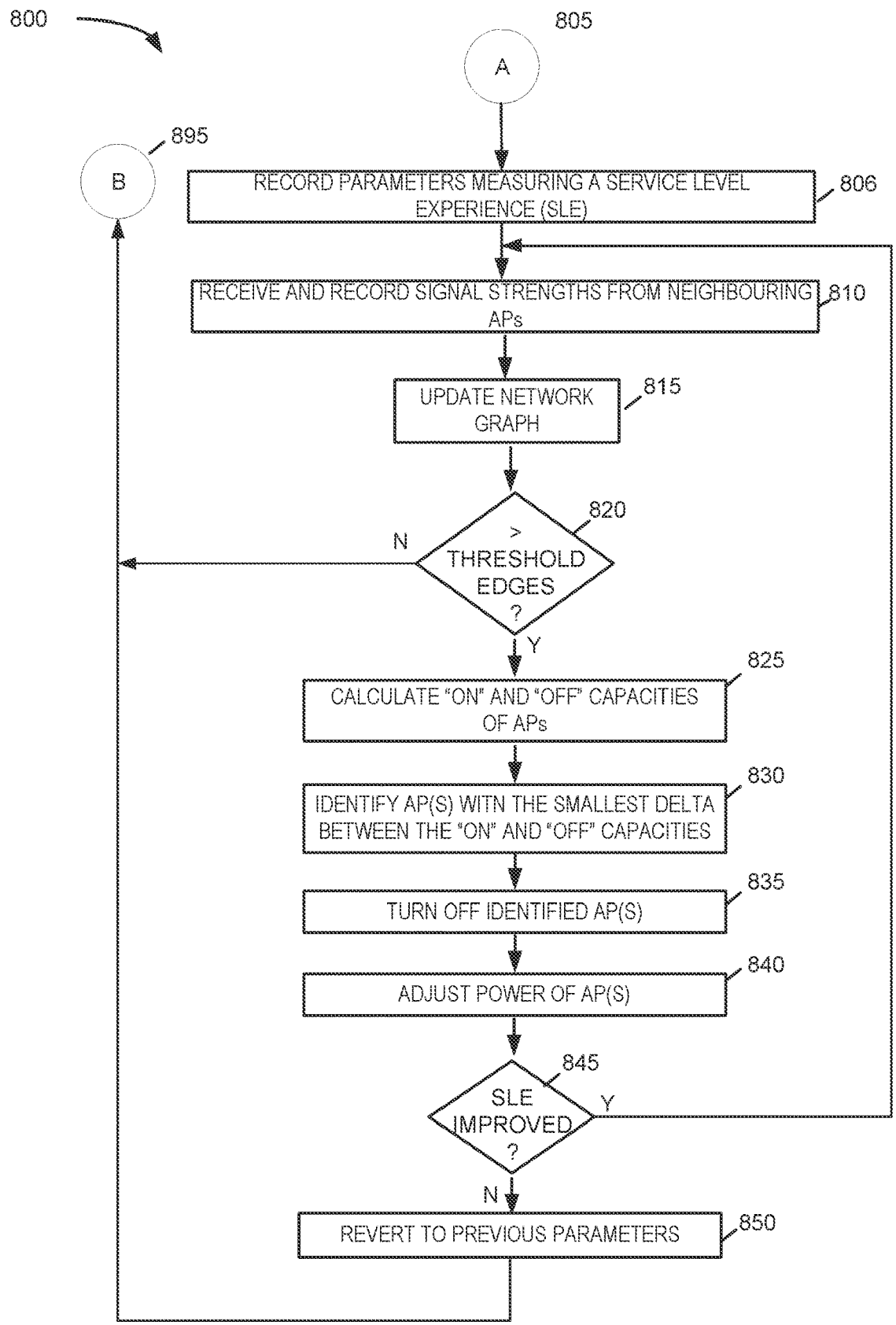

FIG. 8 is a flowchart of an example process performed by one or more of the disclosed embodiments.

Figure 9:
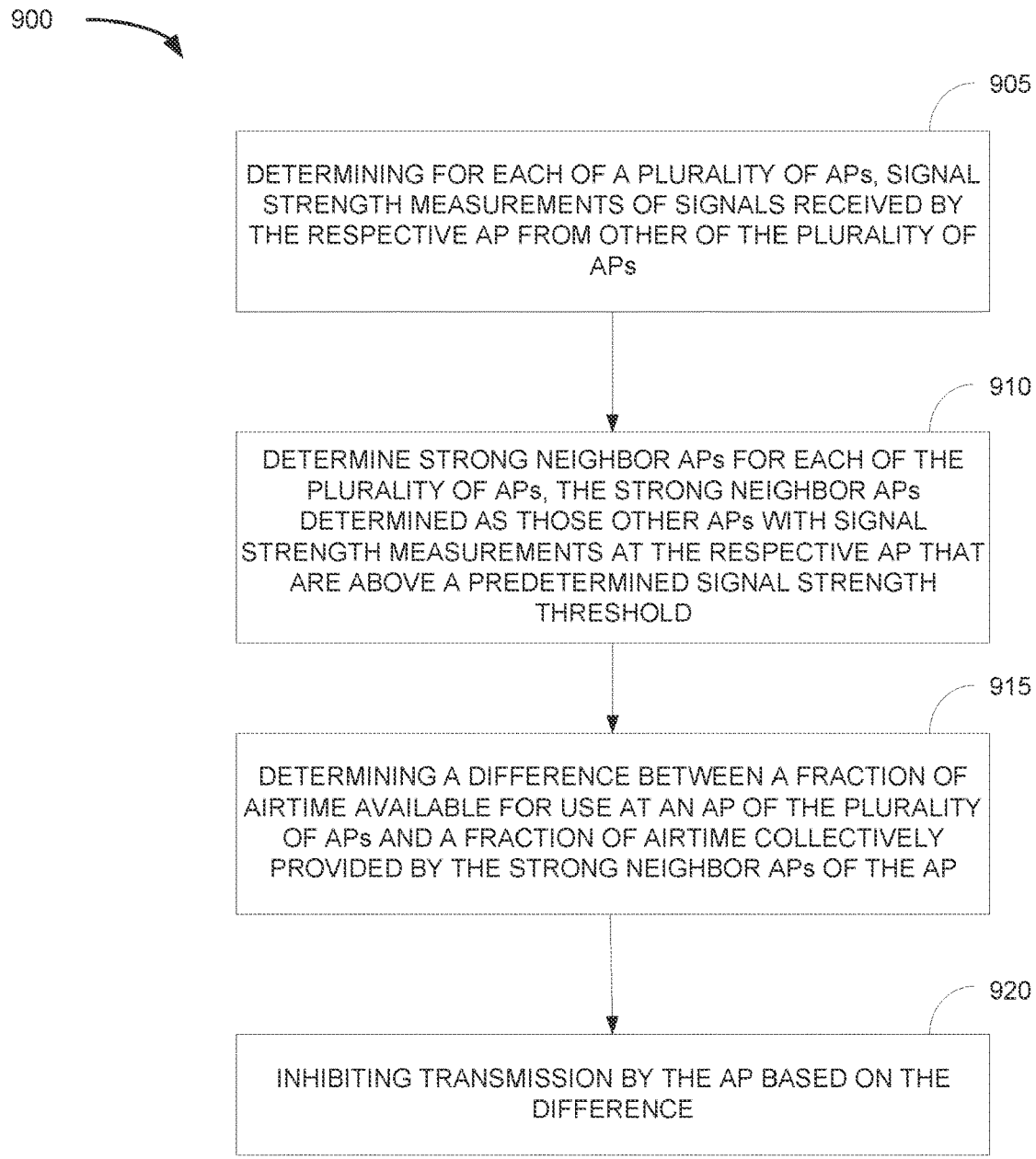

FIG. 9 is a flowchart of an example process performed by one or more of the disclosed embodiments.

DETAILED DESCRIPTION

Wi-Fi was first deployed in an unlicensed frequency band which was used for Industrial, Scientific and Medical (ISM) equipment. The ISM frequency band spans from 2.4 to 2.5 GHz and is referred to as the 2.4 GHz band. There are 14 channels defined for use by Wi-Fi IEEE 802.11 for the 2.4 GHz ISM band. Not all of the channels are allowed in all countries: 11 are allowed by the FCC (Federal Communication Commission) and used in what is often termed the North American domain, and 13 are allowed in Europe where channels have been defined by ETSI (European Telecommunications Standards Institute). The WLAN/Wi-Fi channels are spaced 5 MHz apart (with the exception of 12 MHz spacing between the last two channels).

The channels described above are overlapping and as such users may experience communication degradation due to interference. To guarantee no interference in any circumstances the 2.4 GHz spectrum is divided (in north America) into 3 non-overlapping communication channels with sufficient guard band between these channels. These non-overlapping channels are referred to as channels 1, 6, and 11.

The IEEE 802.11 WLAN standards specify a bandwidth of 22 MHz and channels are on a 5 MHz incremental step. Nominal figures for the channel bandwidth of 20 MHz are often given. The 20/22 MHz bandwidth and channel separation of 5 MHz means that adjacent channels overlap and signals on adjacent channels will interfere with each other.

As the 2.4 GHz band becomes more crowded, many users are opting to use the 5 GHz ISM band. This not only provides additional spectrum, but it is not as widely used by appliances including items such as microwave ovens, etc.

The 5 GHz Wi-Fi bandwidth includes unlicensed ISM channels as well as numerous channels that fall outside the accepted ISM unlicensed band and, as a result, various restrictions are placed on operation at these frequencies. The main concern for using channels that fall outside the ISM unlicensed band is that the Wi-Fi equipment may interfere with operations of weather-radar and military applications (such as military radar and/or communications). To prevent interference, Wi-Fi equipment that operates in these frequencies must implement Dynamic Frequency Selection (DFS) capabilities on these channels. DFS is supported by the IEEE 802.11h wireless local area network standard. DFS is also mandated in the 5470-5725 MHz U-NII band for radar avoidance DFS is a spectrum-sharing mechanism that allows wireless LANs (WLANs) to coexist with radar and other systems. A DFS system listens on a specific band for signal from, e.g., a radar system. If the DFS system detects a signal, the DFS system automatically selects a different frequency and examines the different frequency to see if there is any other equipment operating on it. The DFS system then selects and uses a 5 GHz frequency channel that does not interfere with any radar system.

DFS rules only apply to the frequency band between 5.250 and 5.725 GHz, which is the frequency band used by weather and military radars. It should be noted that DFS based systems are effective only when the incumbent system includes a transmitter that operates over the same frequency channel and as such announces the existence of a receiver on that frequency channel.

While the DFS ensures that receivers of high priority equipment are not affected by interference from Wi-Fi equipment, it does not address needs of the Wi-Fi network users. Specifically, what is needed is a method for determining which APs should be used when the DFS shuts down the 5 GHz frequency channels.

When an AP that operates in the 5 GHz frequency band detects a signal from another device operating in a communication channel used by the AP, to comply with DFS regulations, the AP switches to another communication channel and adds the said communication channel to a "black list" of channels to avoid. Other APs which do not detect/receive the transmission from the higher priority equipment may continue using the said communication channel. In case an AP detects that a higher priority equipment, e.g., weather radar, uses the whole 5 GHz frequency band, the AP must stop using the 5 GHz spectrum and fall back to using only three non-overlapping communication channels of the 2.4 GHz frequency band.

Since the Wi-Fi network may have been designed and or deployed when (some or all of) the 5 GHz channels were available, the fact that some (or all) of the 5 GHz channels become unavailable may necessitate reconfiguration of the Wi-Fi network. More specifically, what is needed is a system and method for determining which radios should be turned off or otherwise inhibited, which radios should switch to other channels and to which channels should they switch (e.g., channels on the 2.4 GHz band), and finally, at what power should the APs transmit on these new communication channels. Once these determinations are made, some of the disclosed embodiments automatically reconfigure the Wi-Fi network with these new parameters (inhibited or active, specific channels, specific power, etc.), and/or provide the information regarding the new parameters to an IT technician, by, for example, outputting to an electronic display, indications of the new parameters.

In some embodiments, a Wi-Fi network capacity is first determined. This determination is based on signal strength measurements (e.g. RSSI) of signals received by each AP from a neighboring AP transmission and further based on air time usage of each AP. Since the signal strength measurements are made prior to inhibiting radio transmitters that may interfere with higher priority receivers, e.g., a receiver of weather radar, a receiver of military equipment, etc., the measurements include, at least in some embodiments, measurements of signal strength for communication channels that may need to be turned off such as channels at the 5 GHz frequency band.

The measured signal strengths are indicative of the Wi-Fi network topology. While each signal strength measurement depends also on the transmission power of the transmitting AP, some of the disclosed embodiments operate such that a signal strength measurement of a signal received by a first AP from a second AP is also indicative of a distance between the first and second AP. In some embodiments, transmission power settings of one or more AP radios is used in the topology assessment to further refine distance determinations.

To determine the capacity of the Wi-Fi network, some embodiments build a Wi-Fi network graph. The network graph identifies, for each AP, neighboring APs having the strongest signals at the respective AP. A first AP is defined to be a strong neighbor for a second AP if a signal received by a second AP from a first AP has a signal strength that is greater than a predetermined threshold. For example, in some embodiments, if the first AP generated signal received by the second AP is greater than −75 db, the first AP is considered by the second AP to be a strong neighbor.

While the discussion below considers only edges (communication paths between two APs) for which the measured signal strengths in both directions exceed the predetermined threshold. In some other embodiments, the network graph is generated to include additional edges having signal strength measurements below the threshold. While the discussion below describes an embodiment where all of the 5 GHz channels are unavailable, other embodiments may operate when one or more 5 GHz channels are available.

As discussed above, some of the disclosed embodiments identify signal strength measurements between AP pairs. For example, a network graph including three APs may define pairs (AP1, AP2), (AP1, AP3), and (AP2, AP3). In some embodiments, the network graph is constructed to indicate signal strength measurements for signals generated by a first AP of the pair and received by a second AP of the pair. The disclosed embodiments then count a number of APs paired with each individual AP. Some embodiments do not explicitly construct a network graph but still determine signal strength measurements (e.g. received signal strength indications (RSSIs)) between APs in a network.

When no 5 GHz channels may be used (e.g. all are blacklisted), some of the disclosed embodiments turn off turn off 5 GHz radio(s) and switch to operating on the 2.4 GHz band. In some embodiments, only three communication channels i.e., 1, 6, and 11 are available in the 2.4 GHz band. To avoid interference when using this fewer number of channels, the disclosed embodiments seek to limit each AP to having no more than a threshold number (e.g. three) of strong neighbors. If the process determines that one or more APs have more than the threshold number of neighbors, the disclosed embodiments turn off one or more APs to reduce the number below the threshold, and thus reduce interference. The discussion below describes a process by which the network automates the process of deciding which APs and specifically which radios in these APs should be turned off and which radios should be switched to operate in the 2.4 GHz frequency band.

Once signal strength measurements between AP pairs is determined, an AP capacity is determined for both when an AP is "on" and when the AP is "off".

The capacity of an AP in the "on" state is defined, in some embodiments, to be:

$$AP_j \text{ "on" Capacity} = C_1 - R_x Other\ BSS \qquad \text{Equ. 1}$$

where:
$AP_j$ "on" Capacity Fraction of available air-time for client to use,
$C_1$ Coefficient e.g., 0.85,
$R_x$Other BSS Fraction of air-time used by clients associated with $AP_j$.

The capacity of the AP in the "off" state is defined, in some embodiments, to be:

$$AP_j \text{ "off" Capacity} = \left(\sum_i (C_1 - R_x Other\ BSS)\right) / Wt_{i \to j}(SS_{i \to j}). \qquad \text{Equ. 2}$$

where:
$AP_j$ "off" Capacity Fraction of airtime provided by neighboring APs,
$C_1$ Coefficient e.g., 0.85,
i index of APs whose signal is received by $AP_j$,
$Wt_{i \to j}$ ($SS_{i \to j}$) contribution of the signal strength measurements of signals received from $AP_i$ by $AP_j$ to the AP density, and is defined by:

$$Wt_{i \to j}(SS_{i \to j}) = SS_{i \to j} - Ave\ SS)/\delta \qquad \text{Equ. 3}$$

where:
SSI$_{i \to j}$ signal strength measurement of signal as received from AP$_i$ by AP$_j$,
Ave SS average signal strength for a specific site,
δ standard deviation from equation 5 below.

The average signal strength for a site is calculated, in some embodiments, via:

$$Ave\ SS = (\Sigma_{All\ I\ \&\ J\ combinations} SS_{i \to j})/n \qquad \text{Equ. 4}$$

where:
Ave SS average signal strength measurement for the site,
n number of combinations of i and j resulting in signal strength (e.g. RSSI) measurement greater than a predetermined threshold The standard deviation is calculated, in some embodiments, by:

$$\delta = \sqrt[2]{\left(\frac{1}{n-1}\right)(\Sigma_i (SSi - Ave\ SS) **2)} \qquad \text{Equ. 5}$$

where:
δ standard deviation,
SS$_i$ the ith signal strength measurement (e.g. RSSI) from the n measured signal strengths,
n number of combinations of i and j resulting in signal strength measurement,
Ave SS average signal strength for the group of APs (e.g. calculated via equation 1 above).

While Equation 3 above uses the average signal strength, some embodiments utilize a median or other suitable measurement that can reduce the dependence on outlier values.

To determine which APs should be turned off, some of the disclosed embodiments consider APs that have more than a threshold number of strong neighbors and compare the "on" and "off" capacities for each AP. Some embodiments identify an AP for which the delta between the "on" and "off" capacities is the smallest and turns that AP off. In some embodiments, an AP is turned off by instructing a radio resource manager (RRM) to turn off the specific radio in the particular AP. When an AP has multiple radios, some embodiments perform the analysis for each radio in the AP.

When one or more of the disclosed embodiments determine that a specific radio should be turned off, the signal strength measurement for signals received by the neighbor of that AP (from the said AP) drops to zero. The network graph is updated accordingly and as such the number of strong neighbors observed by the neighboring APs (edges) drops by one.

To ensure proper coverage with the smaller number of remaining active APs (APs that have not been turned off) the power of each one of the remaining APs (radios in the APs) is adjusted to be, in some embodiments:

$$AP_j\ Power = Max\ AP_j\ Power - \qquad \text{Eq. 6}$$
$$\sum_{i=1}^{n} Wt_{i \to j}(RSSI_{i \to j} + (Max\ AP_i\ Power - APi\ current\ Power))$$

where:
AP$_j$ Power Power setting for the j$^{th}$ AP,
Max AP$_i$ Power Maximum power setting for the i$^{th}$ AP,
Max AP$_j$ Power Maximum power of the radio of the j$^{th}$ AP,
n number of strong neighbors of the j$^{th}$ AP,
SS$_{i \to j}$ signal strength of signal(s)s received by AP$_{j\ a}$ as a result of transmission by AP$_i$ In some embodiments, a power setting for one or more APs that are turned off is set to zero.

SS$_{i \to j}$ is a signal strength measurement in association with the current transmission power setting (before it is adjusted to the new power setting). With the new power settings (either zero or a value per equation 6), some embodiments iterate back and measure the mutual signal strengths of signals received by the remaining active APs from their neighbors and generate a new graph as described above. This also includes updating accordingly the number of strong neighbors (signal strength above the predetermined threshold) that each AP observes.

Once the number of strong neighbors is updated, the disclosed embodiments iterate and identify any APs which still have more than the threshold number of strong neighbors. This may continue in some embodiments until a number of strong neighbors for each AP meet a criterion, such as being less than or equal to the threshold number of strong neighbors. Once this is achieved, some embodiments assigning the three communication channels (in the 2.4 GHz frequency band) to the APs still operating. This method reduces the probability of interference between the APs that are still operating.

In some embodiments, once a specific AP (radio of an AP) is turned off, the capacities associated with the remaining APs are recalculated. In some embodiments, a modification of one AP does not cause a change large enough to other AP capacities such that they are not necessarily re-calculated. In this case, capacities determined prior to the specific AP's modification are further utilized to select more than one AP (radio) that should be turned off.

In some embodiments, rather than repeating the algorithm, for APs that have more than the predetermined threshold number of strong neighbors, a predetermined parameter defines a percentage of APs to turn off. For example, if the predetermined parameter is set to 0.3, these embodiments turns off no more than 30% of the APs that continue to have more than the predetermined number of strong neighbors. For example, assume that seven APs with more than the threshold number of strong neighbors are identified. In a first iteration, some embodiments turn off no more than 7*0.3=2.1, or specifically two (2) APs. Depending on the topology of the specific network, turning one or two APs can alleviate the issue and result in a network with the APs having a number of strong neighbors below the predetermined threshold.

If after inhibiting transmissions by the number of APs defined by the predetermined parameter (e.g. two (2) in the example above) there remain one or more APs with greater than the predetermined threshold of strong neighbors, these embodiments monitor the operation of the network after e.g., two nodes were turned off, and specifically, monitor the system level experience (SLE) exhibited by the network for a predetermined duration, e.g., an hour, a day, etc. If the SLE meets a predetermined goal, e.g., interference smaller than a predetermined value, number of APs turned off is held at a constant value. The system level experience is measured, in various embodiments, by a combination of one or more parameters, including but not limited to interference levels, latency, throughput, jitter, percentage of dropped connections, quantity or percentage of packet errors and/or collisions, or other network performance parameters. In some embodiments, one or more of these various measurements are aggregated to form an SLE measurement. For example, one or more of the measurements are added or averaged, or a median of each measurement is determined. In some aspects, each measurement is normalized based on a moving average of the measurement, and the normalized values are aggregated (averaged, added, etc) to form an SLE measurement. In some cases, varying weights are given to each of the measurements before the measurements are aggregated.

If the predetermined SLE goal is not achieved, some of the disclosed embodiments perform at least one additional iteration. This additional iteration results in inhibiting transmissions by at least one additional AP using the process described above. Specifically, AP capacities are calculated (both for the "on" and "off" state), an AP with a lowest delta between the "on" and "off" capacities (or a number of strong neighbors greater than the threshold) is selected and turned off. Some embodiments iterate until there are no more APs with more than the threshold number of strong neighbors or until a predetermined portion (e.g., 0.3) of the APs are turned off. Some embodiments iterate until a predetermined SLE is achieved or until remaining APs have the threshold number or less strong neighbors.

FIG. 1 shows an example system 100 implemented in accordance with at least some of the disclosed embodiments. The example system 100 includes a plurality of access points (AP1 142, . . . , AP X 144, AP 1' 150, . . . , AP X' 152) wherein an access point can be a wireless access point a router, a switch, or any other device capable of providing network access, a plurality of Authentication, Authorization and Accounting (AAA) servers (only one AAA server 110 is shown), a plurality of Dynamic Host Configuration Protocol (DHCP) servers (only one DHCP server 116 is shown), a plurality of Domain Name System (DNS) servers (only one DNS server 122 is shown), a plurality of Web servers (only one Web server 128 is shown), and a network management system (NMS) 136, e.g., an automated network configuration system (server), which are coupled together via network 134, e.g., the Internet and/or an enterprise intranet. The network 134 consists of numerous routers 185 and numerous switches 180. Network communications links (143, 145, 171, 173) couple the access points (AP1 142, AP X 144, AP 1' 150, AP X' 152) respectively, to network 134. Network communications link 111 couple the AAA servers (only AAA server 110 is shown) to network 134. Network communications link 117 couple the DHCP servers (only one DHCP server 116 is shown) to network 134. Network communications link 123 couple the DNS servers (only one DNS server 122 is shown) to network 134. Network communications link 129 couple the Web servers (only one Web server 128 is shown) to network 134. The system 100 in some embodiments includes a plurality of user equipment devices (UE 1 138, . . . , UE Z 140, UE 1' 146, . . . , UEZ' 148) wherein user equipment is any wired, wireless, or optical equipment providing network access to communication devices used by users such as people or automated devices such as IoT devices. Some of the UEs (138, 140, 146, 148) are wireless devices which may move throughout system 100.

In some embodiments, the access points are located at different customer premise site. Customer premise site 1 102, e.g., a mall, includes access points (AP 1 142, . . . , AP X 144). Customer premise site 2 104, e.g., a stadium, includes access points (AP 1' 150, . . . , AP X' 152). As shown in FIG. 1, UEs (UE 1 138, . . . , UE Z 140) are currently located at customer premise site 1 102; UEs (UE 1' 146, . . . , UE Z' 148) are currently located at customer premise site 2 104. Each one of the servers, routers, switches, APs, UEs NMS, and other servers attached to the network, in some embodiments, include a system log or an error log module wherein each one of these devices records the status of the device including normal operational status and error conditions.

Figure 2:
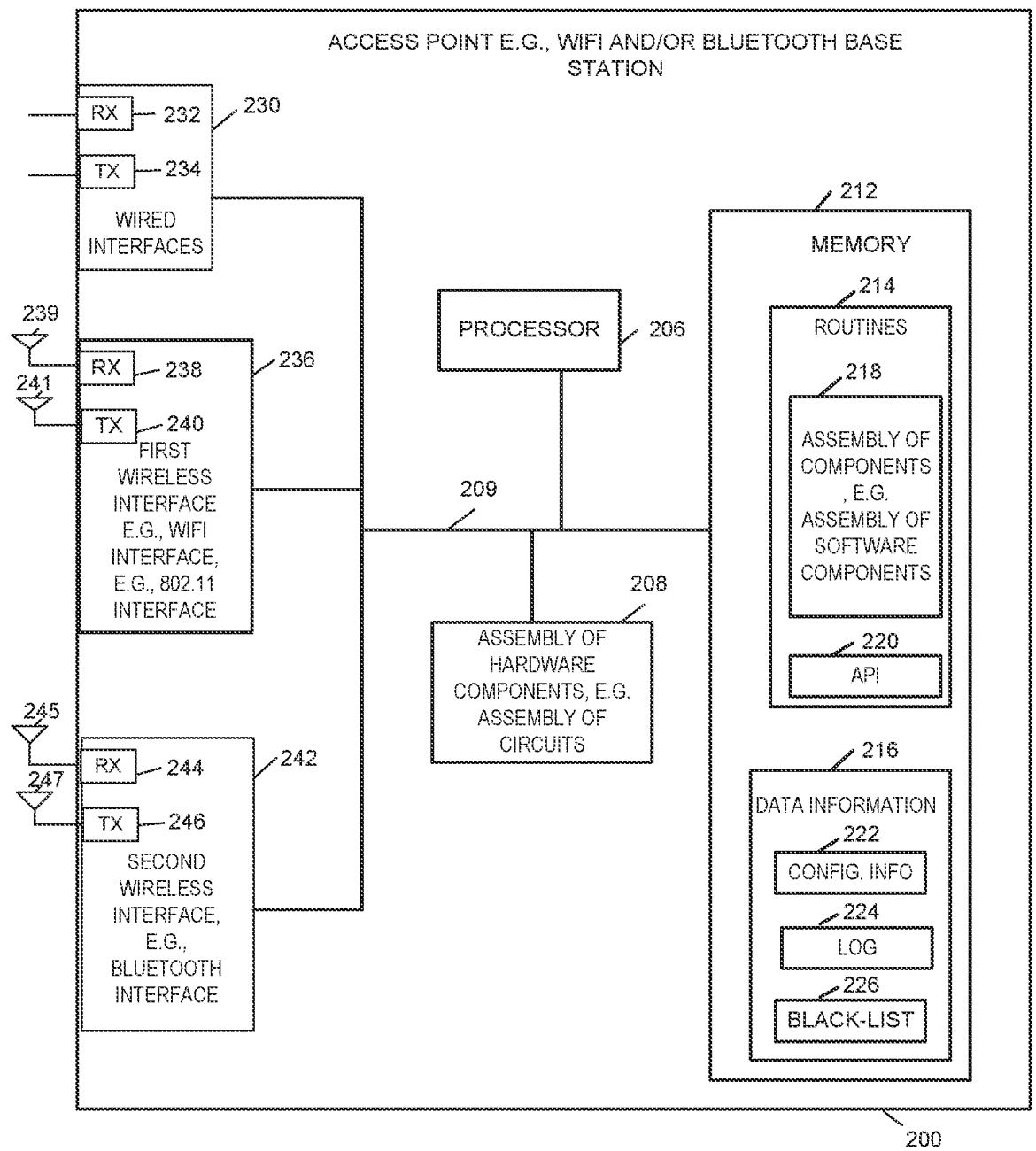
FIG. 2 is a block diagram illustrating an embodiment of wireless access point which can be used in the system shown in FIG. 1.

FIG. 2 shows an example of an access point 200 (e.g., access points AP 1 142, . . . , APX 144, AP 1' 150, APX' 152) in accordance with one or more of the disclosed embodiments.

Access point 200 includes wired interface 230, wireless interfaces 236, 242, a processor 206, e.g., a CPU, a memory 212, and an assembly of components 208, e.g., assembly of hardware components, e.g., assembly of circuits, coupled together via a bus 209 over which the various elements may interchange data and information. Wired interface 230 includes receiver 232 and transmitter 234. The wired interface couples the access point 200 to a network and/or the Internet 134 of FIG. 1. First wireless interface 236, (e.g., a Wi-Fi interface or an 802.11 interface), includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Second wireless interface 242, (e.g., a Bluetooth interface), includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data/information 216. Routines 214 include assembly of components 218, e.g., an assembly of software components, and Application Programming Interface (API) 220. Data/information 216 includes configuration information 222, device status log including error events and normal events captured as messages in a system log or an error log 224 and a black-list 226 which identifies all of the 5 GHz channels on which higher priority devices such as weather radar, military communications, etc. have been previously discovered and should not be used.

Figure 3:
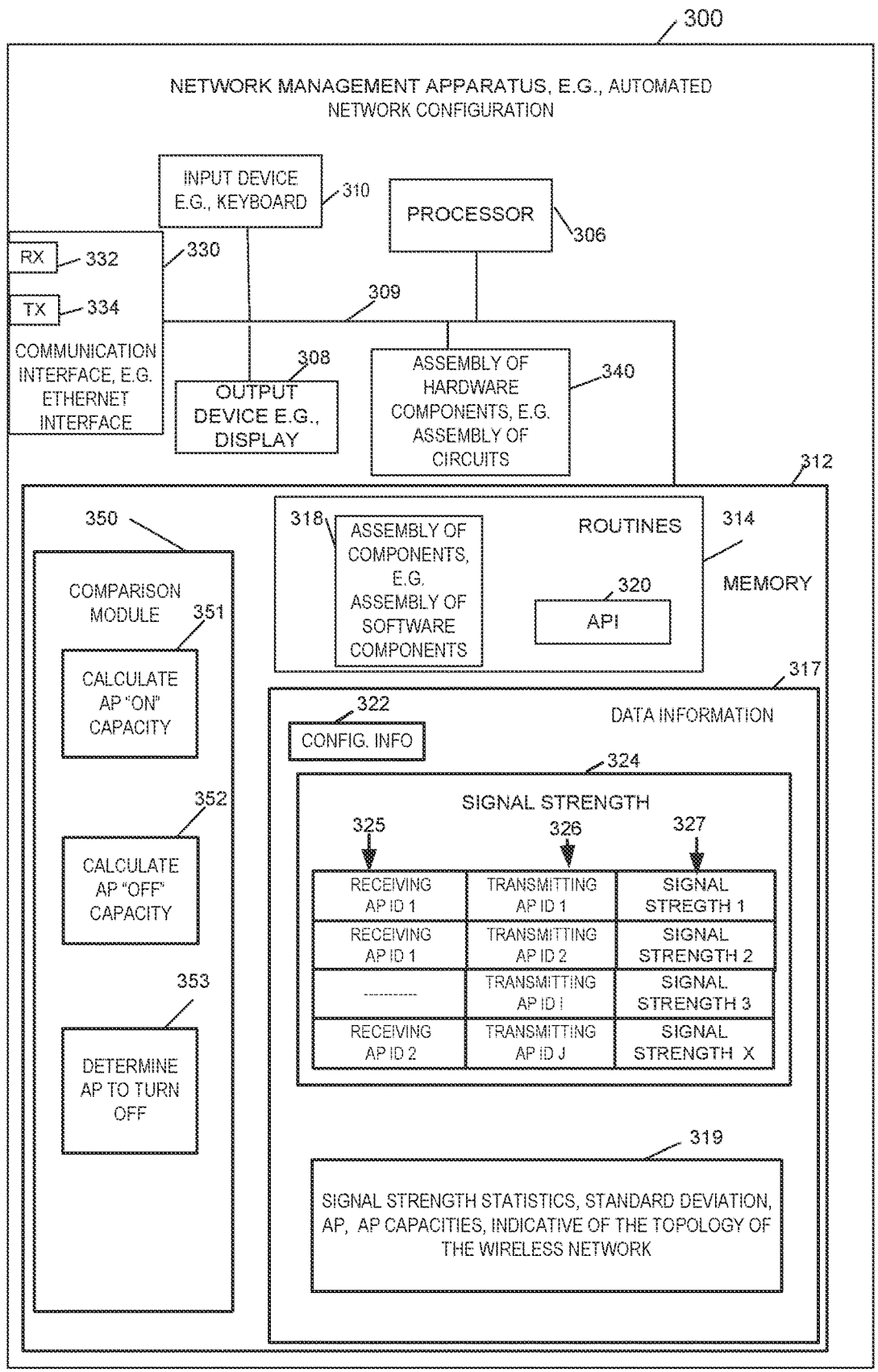
FIG. 3 is a block diagram illustrating an embodiment of network management apparatus, e.g., real-time and/or predictive fault detection and correction device that can be implemented as a standalone network device, e.g., server or incorporated into another network device, e.g., an access point of FIG. 1.

FIG. 3 shows an example network management apparatus 300, e.g., an automated network reconfiguration network management node, in accordance with one or more of the disclosed embodiments. In some embodiments, the network management apparatus 300 is a network management node, e.g., a network management server such as network management automated network reconfiguration server. In some embodiments, network management apparatus 300 of FIG. 3 is network management system (NMS) 136 of FIG. 1. In some embodiments the network management apparatus 300 is or is part of an access point such as any one of the access points or devices shown in FIG. 1.

Network management apparatus 300 includes a communications interface 330, a processor 306, an output device 308, e.g., display, printer, etc., an input device 310, e.g., keyboard, keypad, touch screen, mouse, etc., a memory 312 and an assembly of components 340, e.g., assembly of hardware components, e.g., assembly of circuits, coupled together via a bus 309 over which the various elements may interchange data and information. The communications interface 330 includes an Ethernet interface in some embodiments. Communications interface 330 couples the network monitoring system 300 to a network and/or the Internet.

Communications interface 330 includes a receiver 332 via which the network monitoring apparatus can receive data and information, e.g., including service related information, e.g., message such as messages logged in a system log or an error log from a variety of devices such as AAA server, DHCP server, Web server, routers, switches, and a transmitter 334, via which the network monitoring apparatus 300 can send data and information, e.g., including configuration information and instructions, e.g., instructions to access points, routers, switches, or any other server attached to the network, to restart, change operating parameters, download and install another SW version, etc.

Memory 312 includes routines 314 and data/information 317. Routines 314 include assembly of components 318, e.g., an assembly of software components, and Application Programming Interface (API) 320. Data/information 317 includes configuration information 322, recorded signal strength measurement log 324 including signal strength measurements from each one of the operational APs. The memory 312 also includes signal strength statistics including AP's capacities indicative of the network topology 319 including ID of a receiving AP 325, ID of a transmitting AP 326, and signal strength measurements of signals received by the receiving AP transmitted by the transmitting AP 327. For example, the table illustrates that AP ID 1 received a signal having a signal strength measurement 1 from AP ID2, a second signal with signal strength measurement 2 from AP ID2. AP ID 2 received a third signal with a signal strength measurement x from AP ID j. In general, column 325 is a list of the receiving APs, column 326 is a list of the transmitting APs, and column 327 is a list of the measured signal strength. This and other tables disclosed herein are provided as examples. Other embodiments may utilize different data structures.

The memory 312 also includes calculated AP capacities for the "On" state 351, calculated "Off" capacities 352 and the delta between the "On" and the "Off" capacities 353 for all of the active APs including the APs for which the delta between the "On" and "Off" capacities is the smallest. As explained above, the APs which present the smallest delta between their capacities in the "On" state and the "Off" state are the candidates for being turned off (deactivated or otherwise inhibited).

Figure 4:
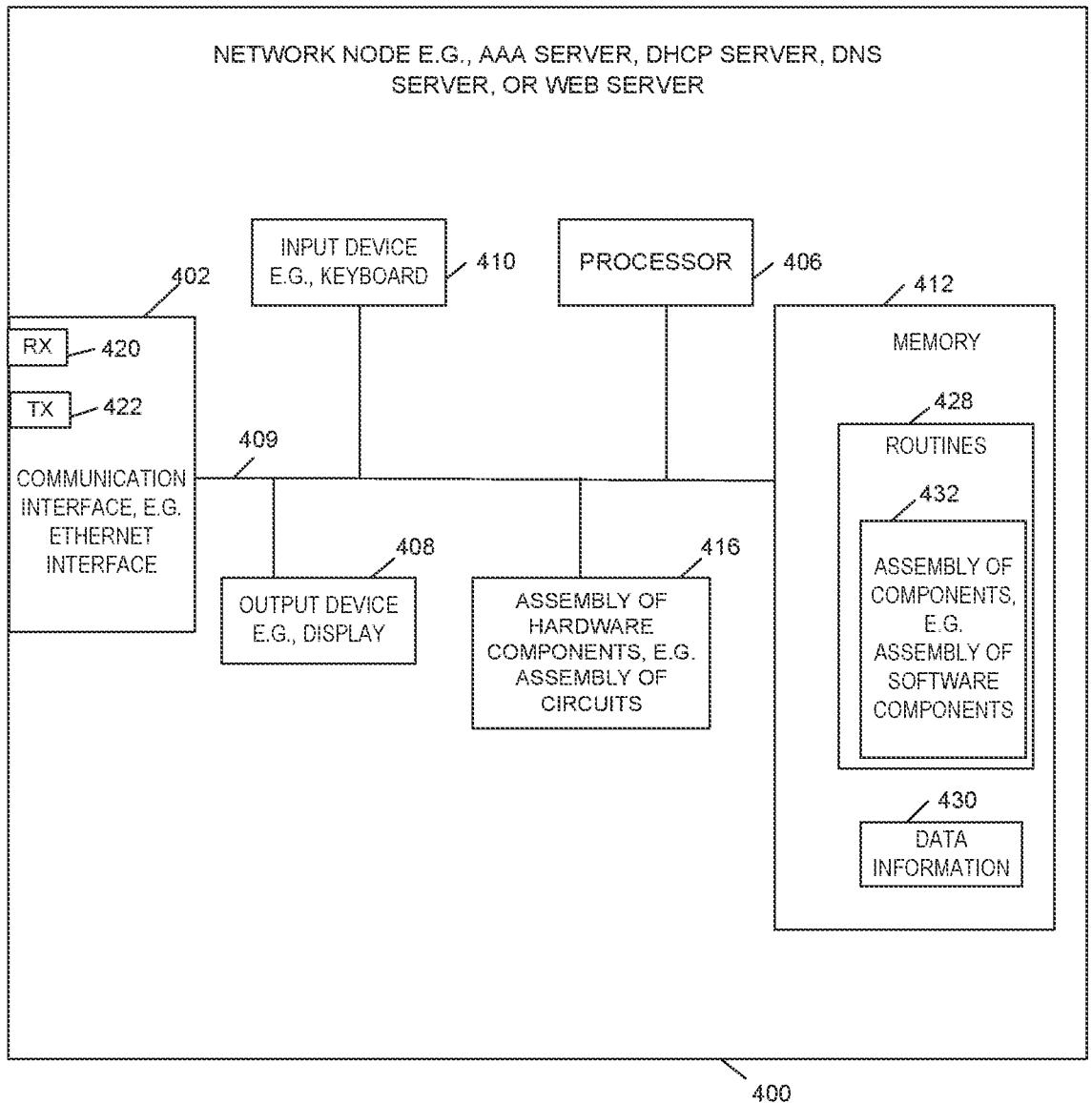
FIG. 4 is a block diagram illustrating an example network node that can be used as any one of several devices shown in FIG. 1.

FIG. 4 shows an example network node 400, e.g. a device or a server attached to network 134, e.g., router, switch, AAA server, DHCP server, DNS server, Web server, etc., or a network device such as, e.g., routers 185, switches 180, etc. In some embodiments, network node 400 of FIG. 4 is server 110, 116, 122, 128, of FIG. 1 or routers 185, switches 180 of FIG. 1. Network node 400, e.g. a server, includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of components 416, e.g., assembly of hardware module, e.g., assembly of circuits, coupled together via a bus 409 over which the various elements may interchange data and information. Communications interface 402 couples the network node 400 to a network and/or the Internet. Though only one interface is shown, those skilled in the art should recognize that routers and switches may, and usually do, have multiple communication interfaces. Communications interface 402 includes a receiver 420 via which the network node 400, e.g. a server, can receive data and information, e.g., including operation related information, e.g., registration request, AAA services, DHCP requests, Simple Notification Service (SNS) look-ups, and Web page requests, and a transmitter 422, via which the network node 400, e.g., a server, can send data and information, e.g., including configuration information, authentication information, web page data, etc.

Memory 412 includes routines 428 and data/information 430. Routines 428 include assembly of components 432, e.g., an assembly of software components and data information 430. Data information 430 includes system log and/or error log.

Figure 5:
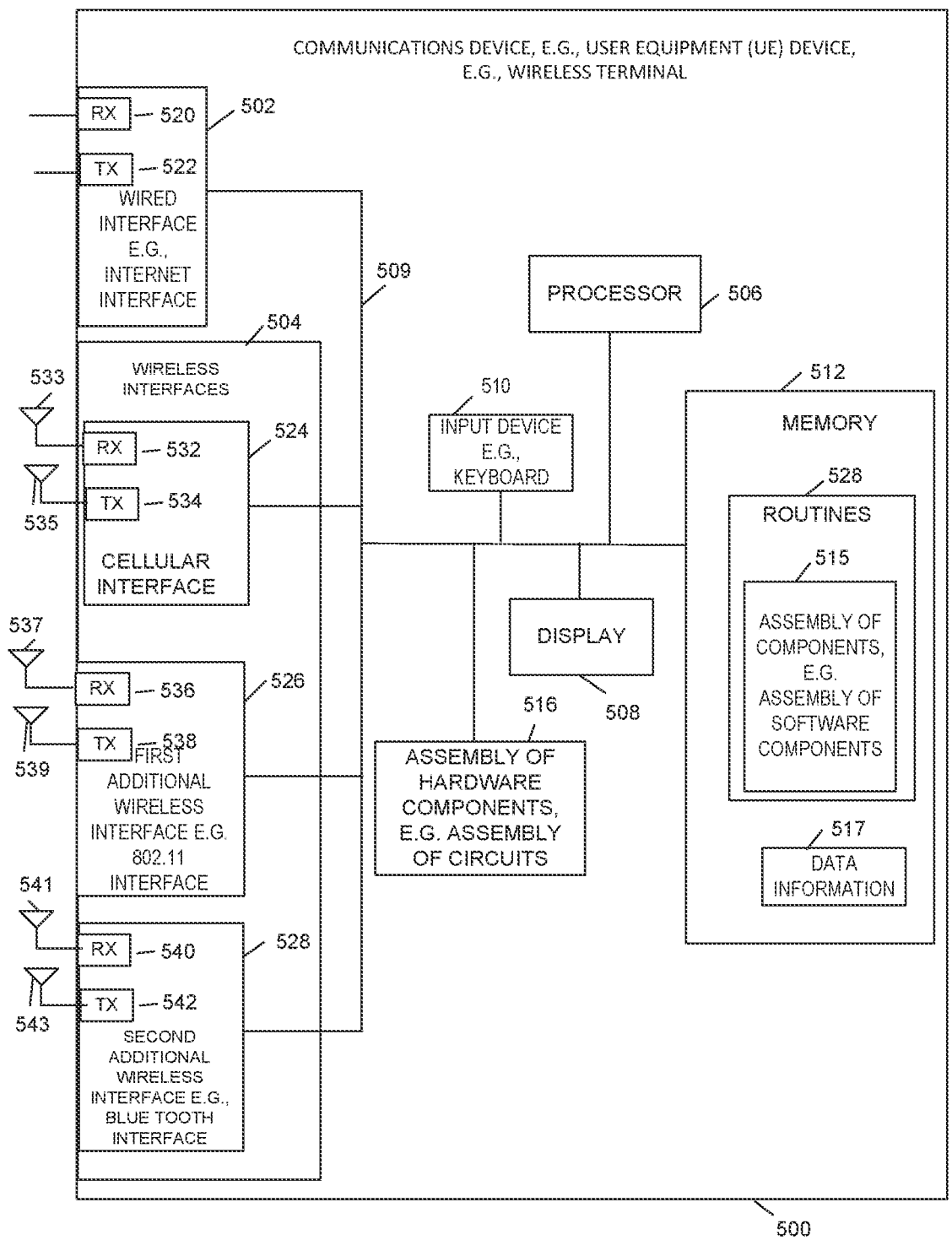
FIG. 5 is a block diagram illustrating an embodiment of an example communications device such as WT which can be used as a UE in the system of FIG. 1.

FIG. 5 shows an example communications device 500, e.g. a user equipment (UE) device (e.g., user equipment UE 1 138, . . . , UE Z 140, UE 1' 146, . . . , UE Z' 148) in accordance with one or more of the disclosed embodiments. Communications device 500, e.g., a UE, includes wired interfaces 502, wireless interfaces 504, a processor 506, e.g., a CPU, a memory 512, and an assembly of components 516, e.g., assembly of hardware module, e.g., assembly of circuits, coupled together via a bus 509 over which the various elements may interchange data and information. Wired interface 502 includes receiver 520 and transmitter 522. The wired interface 502 couples the communications device 500, e.g. a UE, to a network and/or the Internet 134 of FIG. 1.

The wireless interface 504 includes cellular interface 524, first additional wireless interface 526, e.g., 802.11 Wi-Fi interface, and a second additional wireless interface 528, e.g., Bluetooth interface. The cellular interface 524 includes a receiver 532 coupled to receiver antenna 533 via which the communications device 500, e.g. UE, may receive wireless signals from access points, e.g., AP 1 142, . . . , APX 144, AP 1' 150, APX' 152, and transmitter 534 coupled to transmit antenna 535 via which the communications device 500, e.g. UE, may transmit wireless signals to APs, e.g., AP 1 142, . . . , APX 144, AP 1' 150, APX' 152. First additional wireless interface 526, e.g., a Wi-Fi interface, e.g. 802.11 interface, includes receiver 536 coupled to receive antenna 537, via which the communications device 500, e.g., UE, may receive wireless signals from communications devices, e.g., APs, and transmitter 538 coupled to transmit antenna 539 via which the communications device 500, e.g., UE, may transmit wireless signals to communications devices, e.g., APs. Second additional wireless interface 528, e.g., a Bluetooth interface, includes receiver 540 coupled to receive antenna 541, via which the communications device 500, e.g. a UE, may receive wireless signals from communications devices, e.g., APs, and transmitter 542 coupled to transmit antenna 543 via which the communications device 500, e.g., a UE, may transmit wireless signals to communications devices, e.g., APs.

Memory 512 includes routines 528 and data/information 517. Routines 528 include assembly of components 515, e.g., an assembly of software components. Data/information 517 may include configuration information as well as any additional information required for normal operations of UE 500. Data information includes also system log or error log.

FIG. 6A is an example network graph 600a for a network such as the system of FIG. 1. The illustrated network has nodes (APs) {A, B, C, D, E, F, and G}. The nodes have {4, 4, 4, 3, 3, 4, and 6} neighbors respectively. When all of the associated 5 Ghz the Wi-Fi of this network are black listed operating this network, as is, with only three available 2.4 Ghz would cause interferences. To prevent SLE degradation due to interference, the network must deactivate one or more APs. Per discussion above, the network selects node(s) (APs) for which the delta between the "On" and "off" capacity is the smallest and turns them off. For example, in the illustrated network the system may automatically deactivate (turn off) node G resulting in the network graph of FIG. 6b.

FIG. 6B is a network graph 600b of the same network as that illustrated by network graph of FIG. 6A, except that network graph 600b illustrates the network after one AP, specifically node G, has been inhibited or turned off. The graph 600b has nodes that have at most three strong neighbors. This graph can be accommodated via three available 2.4 Ghz channels. Some embodiments automatically assign one of these three channels to each one of the remaining active APs.

FIG. 6C is another example network graph 600c of another network such as the system of FIG. 1. The illustrative network has eight nodes (APs) {A, B, C, D, E, F, G and H}. The nodes have {4, 6, 6, 5, 5, 4, 6, and 2} neighbors respectively. When all of the associated 5 GHz the Wi-Fi of this network are black listed operating this network, as is, with only three available 2.4 GHz would cause interferences. To prevent SLE degradation due to interference, the network must deactivate one or more APs. Per discussion above, the network selects node(s) (APs) for which the delta between the "On" and "off capacity is the smallest and turns them off. For example, in the illustrated network the system may automatically deactivate (turn off) node G resulting in the network graph of FIG. 6D.

FIG. 6D is an example network graph 600d of the same network illustrated by the network graph 600c of FIG. 6C, except that network graph 600d shows the network after one AP or node, e.g., G, has been inhibited or turned off. The remaining network has nodes {A, B, C, D, E, F, and H}. The nodes have {3, 5, 5, 4, 4, 3, and 2} neighbors respectively. Since the network graph 600d still has nodes with more than three strong neighbors, some of the disclosed embodiments select an additional AP with a difference or delta value between the "On" and "Off" states that is the smallest of the remaining active APs and deactivates this AP or node. For example, node C is deactivated by some embodiments, resulting in the network illustrated in FIG. 6E.

FIG. 6E is another example network graph of the same network illustrated by network graphs 600c and 600d of FIGS. 6C-D respectively, but FIG. 6E shows the network after two APs have been inhibited relative to network graph 600c. The network now has nodes {A, B, D, E, F, and H} having {2, 4, 3, 3, 3, and 1} neighbors respectively. Some embodiments pause any further deactivation of other APs for some predetermined period of time, since two APs have already been deactivated. This pause may be controlled via a threshold, e.g. after a predetermined percentage (e.g. 30%) of active nodes have been deactivated, the pause is initiated. In this example, the network began with eight active nodes. With a predetermined percentage of 30%, 2.4 is an example threshold. In some embodiments, after deactivating two APs or nodes, a pause is initiated since a third node would exceed the predetermined percentage. The pause may last for a predetermined duration D (e.g., D=one day). During the pause time period, some embodiments monitor and record SLE parameter values. When the duration D has expired, some embodiments resume monitoring SLE parameters. If the SLE monitoring indicates an improvement in performance, some embodiments maintain the current configuration. If the deactivation of the APs results in reduced SLE, some embodiments revert the deactivations and thus reactivate those APs previously inhibited.

Alternative embodiments continue to deactivate APs or nodes until there are no APs or nodes with no more than a predetermined threshold (e.g. three (3)) of strong neighbors.

As explained in reference with equation 6, in addition to inhibiting transmissions by specific APs, some embodiments may alternatively modify transmission control parameters of active APs. Transmission control parameters can include one or more of transmission power and/or antennas used for transmission.

FIG. 6F illustrates an example network graph of the same network represented by FIGS. 6C-6E. FIG. 6F shows the network after two APs have been inhibited and the transmission power of active APs has been adjusted. In some cases, when power of particular APs is adjusted, signal strength measurements for some links may fall below a predetermined threshold. This can result in edges between some nodes being dropped. FIG. 6F illustrates such a case wherein a link (edge) between nodes B and E dropped below a predetermined level and as such the link no longer exists in the graph 600f The nodes of this graph each have less than a threshold (e.g. three) number of strong neighbors. This relatively low number of strong neighbors increases the likelihood that devices can be served without interference via available (e.g. three) 2.4 GHz channels.

FIG. 7 is a flowchart illustrating an example process performed by an AP using DFS. In some embodiments, one or more of the functions discussed below with respect to process 700 and FIG. 7 are performed by the network management apparatus 300, network node 400, or communications device 500. In some embodiments, one or more of the functions discussed below are performed by hardware processing circuitry (e.g. any one of 206, 306, 406, or 506). In some embodiments, instructions stored in a memory (e.g. 212, 312, 412, or 512) configure the hardware processing circuitry to perform one or more of the functions discussed below with respect to FIG. 7 and process 700.

The process 700 starts at operation 705 and proceeds to operation 710. Operation 710 identifies potential interference with weather radar or operations of other higher priority devices in the 5 GHz frequency band. If operation 710 does not detect any interference, the process 700 continues to monitor the wireless medium via operation 710. If interference is detected, process 700 moves to operation 715.

In operation 715 the method determines whether the AP has an alternate 5 GHz channel to use. If the AP has an alternative 5 GHz channel the method proceeds to operation 720 where the radio of the AP is switched to the alternative channel. The process proceeds to operation 722 where the interfering channel is added to the black-list of channels in that AP. The method loops back to operation 710.

If operation 715 determines that 5 GHz channels of that AP have been already black-listed and the AP does not have an alternate 5 GHz channel to be used, process 700 proceeds to operation 725. In operation 725, the interfering radio of the AP is deactivated (turned off or otherwise transmissions have been inhibited) and the last 5 GHz channel is added to the black-list.

The process proceeds to operation 730 where a new network graph is generated or the old network graph is updated to reflect the deactivation or inhibiting of the AP in the previous operation.

The new network graph is examined in operation 735 where the system determines whether there are isolated network segments. In some embodiments, these network nodes/segments are interconnected to the rest of the network using a 2.4 GHz channels.

The process proceeds to operation 740 where the network management server is triggered to initiate an automated reconfiguration of the network. The process continues via a connecting operation 745 to FIG. 8, and specifically to connecting operation A 805 of FIG. 8.

FIG. 8 is a flowchart illustrating an example process performed by the automated network configuration system. In some embodiments, one or more of the functions discussed below with respect to process 800 and FIG. 8 are performed by the network management apparatus 300, network node 400, or communications device 500. In some embodiments, one or more of the functions discussed below are performed by hardware processing circuitry (e.g. any one of 206, 306, 406, or 506). In some embodiments, instructions stored in a memory (e.g. 212, 312, 412, or 512) configure the hardware processing circuitry to perform one or more of the functions discussed below with respect to FIG. 8 and process 800.

The process starts at a connecting operation 805 and then moves to operation 806. Operation 806 stores one or more system performance metrics that represent a service level experience of a wireless access point system, such as, for example, site 102 of site 104 described above with respect to FIG. 1.

to operation 810 where APs record a signal strength measurement of signals received from their neighbors. These signal strength measurements are provided to a network management server. In some embodiments, this is the automated network configuration server.

In operation 815, the network graph is updated. In some embodiments, the update is performed in a manner consistent with the description of network graph updates of FIGS. 6A-6F. As part of the update, signal strength measurements reported by the various APs are compared against a predetermined threshold and only APs having signal strengths greater than the predetermined threshold are structured as an edge in the graph.

Operation 820 examines the network graph and determines whether there is a node (or more than one node) with more than a threshold number of strong neighbors. If the operation determines that there are no nodes with more than the threshold number of strong neighbors, process 800 moves to connecting operation B 895, which returns via connecting operation B 750 to process 700.

If operation 820 determines that there is one (or more) nodes with more than the threshold number of strong neighbors, process 800 moves to operation 825.

In some embodiments of operation 825, process 800 utilizes any one or more of Equations 1 through 5 to calculate the capacities of active APs in both "On" and "Off" states. This includes, in some embodiments, a determination of a capacity delta between the capacities in the "on" and "off" states. Process 800 continues to operation 830 which identifies and selects an AP (node) with the smallest delta capacity between the "on" and "off" states.

In operation 835 the selected AP is deactivated (turned off or otherwise inhibited). Alternatively, a particular radio in the AP is turned off or otherwise inhibited. With the AP turned off or otherwise inhibited, process 800 moves to operation 840 where a power level of the remaining active (uninhibited) APs is adjusted. In some embodiments, this adjustment is performed in accordance with Equation 6, discussed above.

Operation 845 compares a service level experience (SLE) achieved with the newly reconfigured system (with some APs turned off and power adjusted on the remaining active APS) against the previous SLE. If the adjustment improved the SLE, the process loops back to operation 810 where the new signal strength measurements are recorded, and the process repeats with the new adjusted power level.

However, if the newly modified network parameters did not improve the SLE, the process proceeds from operation 845 to operation 850 where the parameters of the network are reverted to the previous parameters which yielded a better SLE. In some embodiments, APs which were turned off or otherwise inhibited are later reenabled again. Transmission power of the APs is reverted to previous settings in some embodiments.

The process loops back to connecting operation B 895, which may be equivalent to connecting operation B 750 of FIG. 7.

FIG. 9 is a flowchart of an example process performed by one or more of the disclosed embodiments. In some embodiments, one or more of the functions discussed below with respect to process 900 and FIG. 9 are performed by the network management apparatus 300, network node 400, or communications device 500. In some embodiments, one or more of the functions discussed below are performed by hardware processing circuitry (e.g. any one of 206, 306, 406, or 506). In some embodiments, instructions stored in a memory (e.g. 212, 312, 412, or 512) configure the hardware processing circuitry to perform one or more of the functions discussed below with respect to FIG. 9 and process 900.

In operation 905, signal strength measurements are determined. The signal strength measurements are of signals received by APs of a plurality of APs. The signals are generated by an AP of the plurality of APs (other than the receiving AP).

In operation 910, strong neighbor APs of each AP are determined. Strong neighbor APs are those APs with signal strength measurements (e.g. RSSI) above a predetermined strength threshold.

In operation 915, a difference between a fraction of airtime available for use at an AP of the plurality of APs (e.g. via Equation 1 above), and a fraction of airtime collectively provided by the strong neighbor APs of the APs is determined (e.g. via Equation 2 above). In some embodiments, the fraction airtime available for use at the AP is a percent utilization of maximum throughput of the respective AP.

Some aspects of operation 915 determine a plurality of differences, one difference for each AP in the plurality of APs. Some aspects of operation 915 determine a portion of the plurality of APs with a count of strong APs above a predetermined threshold. In these aspects, the differences are determined only for the portion of APs.

In operation 920, transmissions by the AP are inhibited based on the difference determined in operation 915. In some embodiments, an AP having the smallest determined difference is inhibited. In some embodiments, the transmitter of the AP is inhibited in response to detecting a 5 GHz channel is unavailable for use by the plurality of APs. Inhibiting transmissions by the AP places the AP in a state such that the AP does not transmit onto the wireless network or that its wireless transmissions are substantially reduced. For example, in some embodiments, an inhibited AP still responds to management and/or control messages but does not provide data service. In other embodiments, an inhibited AP ceases all transmissions.

In some embodiments, inhibiting transmission can include powering off a transmission component of the AP (e.g. such as any of transmitter 240, 246, 334, 422, 522, 534, 538, or 542). Power is restored to the transmission component to reenable transmissions by the AP. In some other embodiments, inhibiting transmission disables transmission by the AP. For example, the inhibiting of transmissions by the AP in these embodiments is controlled by firmware or software running on the AP device and does not change an operable state of transmission hardware of the AP. In some other embodiments, transmission hardware is configured to operate in multiple modes. One of the multiple modes inhibits transmission by the transmission hardware. Thus, in some embodiments, inhibiting transmission includes changing a mode of transmission hardware to accomplish inhibition of transmissions. The hardware may also be removed from this mode to resume transmission by the AP in at least some aspects.

Some embodiments of operation 920 adjust transmission power levels of one or more of the remaining APs (e.g. those APs not shutdown, deactivated, or otherwise inhibited from transmitting).

Some embodiments iteratively perform process 900, or at least operations 910 and 915 after shutting down an AP in operation 920. For example, strong neighbors for each remaining AP are determined after the AP is inhibited in operation 920. Based on this new set of strong neighbors, new differences are determined. The new differences are determined, in some embodiments, for those remaining APs with a number of strong neighbors above the predetermined neighbor threshold. A second AP is inhibited, in some embodiments, based on the new differences. For example, an AP having the smallest new difference is inhibited from sending further transmissions in some embodiments. Some embodiments continue to iteratively perform operations 910 and 915 (or process 900 generally) until no AP of the plurality of APs has more than a threshold number of strong neighbors (e.g. three).

Some embodiments record one or more system level experience (SLE) parameters between each iterative inhibition of transmission, compare the recorded SLE parameters of a first iteration to recorded SLE parameters of a subsequent iteration, and reenable a transmitter that was previously inhibited in response to the comparison Note that while the disclosure above refers to access points, the embodiments may be equally applied to component radios integrated within an access point. Similarly, references to turning on/off or adjusting an access point can be equally applied to similar operations on one or more component radios of an access point.

The techniques of various embodiments may be implemented using software, hardware and/or a combination of software and hardware. Various embodiments are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various embodiments are also directed to methods, e.g., method of controlling and/or operating a communications device or devices, e.g., a network management node, an access point, wireless terminals (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more operations of a method.

It is understood that the specific order or hierarchy of operations in the processes disclosed is just an example. Based upon design preferences, it is understood that the specific order or hierarchy of operations in the processes may be rearranged while remaining within the scope of the present disclosure. The accompanying method claims present elements of the various operations in a sample order, and are not meant to be limited to the specific order or hierarchy presented.

In various embodiments devices and nodes described herein are implemented using one or more modules to perform the operations corresponding to one or more methods, for example, signal generation, transmitting, processing, analyzing, and/or receiving operations. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method operations can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the operations of the above-described method(s). Some embodiments are directed to a device including a processor configured to implement one, multiple or all of the operations of one or more methods of the disclosed embodiments.

In some embodiments, the processor or processors, e.g., CPUs, of one or more devices, e.g., communications devices such as routers, switches, network attached servers, network management nodes, wireless terminals (UEs), and/or access nodes, are configured to perform the operations of the methods described as being performed by the devices. The configuration of the processor may be achieved by using one or more modules, e.g., software modules, to control processor configuration and/or by including hardware in the processor, e.g., hardware modules, to perform the recited operations and/or control processor configuration. Accordingly, some but not all embodiments are directed to a communications device, e.g., user equipment, with a processor which includes a module corresponding to each of the operations of the various described methods performed by the device in which the processor is included. In some but not all embodiments a communications device includes a module corresponding to each of the operations of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more operations described above. Depending on the embodiment, the computer program product can, and sometimes does, include different code for each step to be performed. Thus, the computer program product may, and sometimes does, include code for each individual operation of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the operations of the methods described herein. The processor may be for use in, e.g., a communications device or other device described in the present application.

While described in the context of a communications system including wired, optical, cellular, Wi-Fi, Bluetooth and BLE, at least some of the methods and apparatus of various embodiments are applicable to a wide range of communications systems including IP and non IP based, OFDM and non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with IP based and non-IP, wired and wireless such CDMA, orthogonal frequency division multiplexing (OFDM), Wi-Fi, Bluetooth, BLE, optical and/or various other types of communications techniques which may be used to provide communications links between network attached or associated devices or other devices including receiver/transmitter circuits and logic and/or routines, for implementing the methods.

Example 1 is a method of operating a communication network. The method includes storing in a storage device RSSI information for a plurality of APs in a communications network, turning off radios of or otherwise inhibiting transmission by APs that could interfere with higher priority equipment, determining network topology based on measured RSSIs, in response to identifying an APs with no 5 GHz connectivity and more than three strong neighbors, a) determine the delta between the "On" and "Off" capacities of each one of said APs, b) select AP with smallest delta between the "On" and "Off" capacities, c) turn off the selected AP, d) automatically adjust the power of each one of the remaining AP operating in the 2.4 GHz spectrum, e) update network topology based on RSSI resulting from automatically adjusted APs power; and repeat steps a) through e) until all active APs have three or less strong neighbors.

In Example 2, the subject matter of example 1 optionally includes measuring RSSI by all active APs of signals from all other active APs, determining an RSSI threshold, ignoring RSSI smaller than said threshold, considering first AP to be a strong neighbor of a second AP if the if the RSSI measured by second AP from a signal transmitted by first AP is greater than the predetermined threshold.

In Example 3, the subject matter of example 1 optionally includes two networks access points are connected if a first AP is a strong neighbor of a second AP.

In Example 4, the subject matter of example 1 optionally includes the "On" capacity of an AP corresponds to a measure of the fraction of available air-time for client to use when the AP is active. In Example 5, the subject matter of example 1 optionally includes the "Off" capacity of an AP corresponds to a measure of the fraction of airtime provided by neighboring APs when said AP is deactivated (turned off or otherwise inhibited).

In Example 5, the subject matter of example 1 optionally includes performing steps a) through e) until all of the active nodes have fewer than a threshold number of strong neighbors In Example 6, the subject matter of claim 1 optionally includes comparing service level experience parameters before performing steps a) through e) with the SLE achieved after performing the loop, maintaining system parameters if the SLE improved as a result of performing the loops; and reverting to the previous operating parameters if the SLE did not improve.

Example 7 is a method of operating a communication network, the method comprising determining strong neighbor APs for each of a plurality of APs, the strong neighbor APs determined as those other APs with signal strength measurements at the respective AP that are above a predetermined signal strength threshold; determining a difference between a fraction of airtime available for use at an AP of the plurality of APs and a fraction of airtime collectively provided by the strong neighbor APs of the AP; and inhibiting transmission by the AP based on the difference.

In Example 8, the subject matter of Example 7 optionally includes counting, for each AP of the plurality of APs, the respective APs strong neighbor APs; and determining a second plurality of APs with counts above a predetermined neighbor threshold; and determining differences between a fraction of airtime available for use at each AP of the second plurality of APs and a fraction of airtime collectively provided by strong neighbor APs of the respective APs, wherein the inhibiting is based on the determined differences.

In Example 9, the subject matter of Example 8 optionally includes determining a third plurality of APs by removing the inhibited AP from the second plurality of APs; determining a second count, for each AP in the third plurality of APs, of strong neighbor APs of the respective AP; determining a fourth plurality of APs with second counts above the predetermined neighbor threshold; determining second differences for each of the fourth plurality of APs; and inhibiting transmission in one of the fourth plurality of APs based on the second differences.

In Example 10, the subject matter of Example 9 optionally includes determining which of the APs in the second plurality of APs has the smallest difference, wherein the shutting down comprises shutting down a transmitter of the AP determined to have the smallest difference.

In Example 11, the subject matter of any one or more of Examples 7-10 optionally include wherein the fraction of airtime available for use at the AP is a percent utilization of maximum throughput of the respective AP.

In Example 12, the subject matter of any one or more of Examples 7-11 optionally include adjusting a transmission power of a remaining portion of the plurality of APs based on the inhibiting of transmission by the AP.

In Example 13, the subject matter of any one or more of Examples 7-12 optionally include iteratively inhibiting transmission by other of APs in the plurality of APs until no AP of the plurality of APs has more strong neighbors than the strong neighbor threshold.

In Example 14, the subject matter of Example 13 optionally includes recording system level experience (SLE) parameters between each iterative inhibiting of transmission, comparing the recorded SLE parameters of a first iteration to recorded SLE parameters of a subsequent iteration, and resuming transmission of a previously inhibited AP in response to the comparison 8 is missing parent: 9. The method of Example 7, further comprising detecting a 11 Ghz channel is unavailable for use by the plurality of APs, wherein the inhibiting of transmission is in response to the detecting.

Example 15 is a system for operating a communication network, comprising hardware processing circuitry; one or more hardware memories storing instructions that when executed configure the hardware processing circuitry to perform operations comprising: determining strong neighbor APs for each of a plurality of APs, the strong neighbor APs determined as those other APs with signal strength measurements at the respective AP that are above a predetermined strength threshold; for an AP of the plurality of APs, determining a difference between a fraction of airtime available for use at the AP and a fraction of airtime collectively provided by the strong neighbor APs of the AP; and inhibiting transmission by the AP based on the difference.

In Example 16, the subject matter of Example 15 optionally includes the operations further comprising: counting, for each AP of the plurality of APs, the respective APs strong neighbor APs; determining a second plurality of APs with counts above a predetermined neighbor threshold, and determining, for each AP in the second plurality of APs, a difference between a fraction of airtime available for use by the respective AP and a fraction of airtime collectively provided by the strong neighbor APs of the respective AP, wherein the shutting down of the transmitter is based on the determined differences for each AP.

In Example 17, the subject matter of Example 16 optionally includes the operations further comprising: determining a third plurality of APs by removing the inhibited AP from the second plurality of APs; determining a second count, for each AP in the third plurality of APs, of strong neighbor APs of the respective AP; determining a fourth plurality of APs with second counts above the predetermined neighbor threshold; determining, for each AP of the fourth plurality of APs, a second difference between a fraction of airtime available for use by the respective AP and a fraction of airtime collectively provided by strong neighbor APs of the respective AP; and inhibiting transmission by one of the fourth plurality of APs based on the second differences.

In Example 18, the subject matter of any one or more of Examples 16-17 optionally include the operations further comprising determining which of the APs in the second plurality of APs has the smallest difference, wherein the shutting down comprising shutting down a transmitter of the AP determined to have the smallest difference.

In Example 19, the subject matter of any one or more of Examples 15-18 optionally include wherein the fraction of airtime available for use at the AP is a percent utilization of maximum throughput of the AP.

In Example 20, the subject matter of any one or more of Examples 15-19 optionally include the operations further comprising adjusting a transmission power of a remaining portion of the at least one of the plurality of APs based on the inhibiting of transmission by the AP.

In Example 21, the subject matter of any one or more of Examples 15-20 optionally include the operations further comprising iteratively shutting down transmitters in APs until no AP has more strong neighbors than the strong neighbor threshold.

In Example 22, the subject matter of Example 21 optionally includes the operations further comprising recording service level experience (SLE) parameters between each iterative inhibiting of transmission, comparing the recorded SLE parameters of a first iteration to recorded SLE parameters of a subsequent iteration, and resuming transmission by an inhibited AP in response to the comparison.

In Example 23, the subject matter of any one or more of Examples 15-22 optionally include GHz channel is unavailable for use by the plurality of APs, wherein the shutting down of the transmitter is in response to the detecting.

Example 24 is a non-transitory computer readable storage medium comprising instructions that when executed configure hardware processing circuitry to perform operations comprising: determining strong neighbor APs for each of a plurality of APs, the strong neighbor APs determined as those other APs with signal strength measurements at the respective AP that are above a predetermined signal strength threshold; determining a difference between a fraction of airtime available for use at an AP of the plurality of APs and a fraction of airtime collectively provided by the strong neighbor APs of the AP; and inhibiting transmission by the AP based on the difference.

In Example 25, the subject matter of Example 24 optionally includes the operations further comprising: counting, for each AP of the plurality of APs, the respective APs strong neighbor APs; determining a second plurality of APs with counts above a predetermined neighbor threshold; and determining differences between a fraction of airtime available for use at each AP of the second plurality of APs and a fraction of airtime collectively provided by strong neighbor APs of the respective APs, wherein the inhibiting of transmission is based on the determined differences.

What is claimed is:

1. A method at a processor comprising:
  for each of a plurality of access points (APs) in a wireless network, in response to determining that one or more signal strength measurements between the AP and one or more other APs of the plurality of APs satisfies a signal strength threshold, identifying, by the processor, each of the one or more other APs as a strong neighbor AP; and
  inhibiting transmission, by one or more APs of the plurality of APs having more than a threshold number of strong neighbor APs, wherein the threshold number of strong neighbor APs is a number greater than one, wherein inhibiting transmission by the one or more APs comprises iteratively inhibiting transmission by the one or more APs having more than the threshold number of strong neighbor APs until no AP of the plurality of APs has more than the threshold number of strong neighbor APs.

2. The method of claim 1, wherein the processor is a processor of an automated network management system communicatively coupled to receive service related information from and send configuration information to the plurality of APs in the wireless network.

3. The method of claim 1, wherein determining that one or more signal strength measurements between the AP and one or more other APs of the plurality of APs satisfies a signal strength threshold comprises:
  determining measured signal strengths in both directions between the AP and the one or more other APs of the plurality of APs satisfy the signal strength threshold.

4. The method of claim 1, wherein the at least one AP of the plurality of APs is a first AP, the method further comprising:
  inhibiting transmission, by the processor, by a second AP of the plurality of APs having more than the threshold number of strong neighbor APs after inhibiting transmission by the first AP of the plurality of APs.

5. The method of claim 1, wherein inhibiting transmission by the at least one AP of the plurality of APs comprises shutting down a transmitter of the at least one AP of the plurality of APs.

6. The method of claim 1, wherein inhibiting transmission by the at least one AP of the plurality of APs comprises adjusting a transmission power of the at least one AP of the plurality of APs.

7. The method of claim 1, further comprising:
adjusting a power level of at least one remaining AP of the plurality APs after inhibiting transmission by the at least one AP of the plurality of APs having more than a threshold number of strong neighbor APs.

8. The method of claim 1, further comprising:
monitoring one or more wireless network performance parameters between each iterative inhibiting of transmission;
comparing the one or more wireless network performance parameters of a first iteration to one or more wireless network performance parameters of a subsequent iteration; and
resuming transmission of a previously inhibited AP in response to the comparison.

9. A system comprising:
hardware processing circuitry;
one or more hardware memories storing instructions that when executed configure the hardware processing circuitry to perform operations comprising:
for each of a plurality of access points (APs) in a wireless network, in response to determining that one or more signal strength measurements between the AP and one or more other APs of the plurality of APs satisfies a signal strength threshold, identifying each of the one or more other APs as a strong neighbor AP; and
inhibiting transmission by one or more APs of the plurality of APs having more than a threshold number of strong neighbor APs, wherein the threshold number of strong neighbor APs is a number greater than one, wherein inhibiting transmission by the one or more APs comprises iteratively inhibiting transmission by the one or more APs having more than the threshold number of strong neighbor APs until no AP of the plurality of APs has more than the threshold number of strong neighbor APs.

10. The system of claim 9, wherein the hardware processing circuitry includes a processor of an automated network management system communicatively coupled to receive service related information from and send configuration information to the plurality of APs in the wireless network.

11. The system of claim 9, wherein determining that one or more signal strength measurements between the AP and one or more other APs of the plurality of APs satisfies a signal strength threshold comprises:
determining measured signal strengths in both directions between the AP and the one or more other APs of the plurality of APs satisfy the signal strength threshold.

12. The system of claim 9, wherein the at least one AP of the plurality of APs is a first AP, and wherein the one or more hardware memories further include instructions that when executed configure the hardware processing circuitry to perform operations comprising:
inhibiting transmission by a second AP of the plurality of APs having more than the threshold number of strong neighbor APs after inhibiting transmission by the first AP of the plurality of APs.

13. The system of claim 9, wherein inhibiting transmission by the at least one AP of the plurality of APs comprises shutting down a transmitter of the at least one AP of the plurality of APs.

14. The system of claim 9, wherein inhibiting transmission by the at least one AP of the plurality of APs comprises adjusting a transmission power of the at least one AP of the plurality of APs.

15. The system of claim 9, wherein the one or more hardware memories further include instructions that when executed configure the hardware processing circuitry to perform operations comprising:
adjusting a power level of at least one remaining AP of the plurality APs after inhibiting transmission by the at least one AP of the plurality of APs having more than a threshold number of strong neighbor APs.

16. The system of claim 9, wherein the one or more hardware memories further include instructions that when executed configure the hardware processing circuitry to perform operations comprising:
monitoring one or more wireless network performance parameters between each iterative inhibiting of transmission;
comparing the one or more wireless network performance parameters of a first iteration to one or more wireless network performance parameters of a subsequent iteration; and
resuming transmission of a previously inhibited AP in response to the comparison.

17. Non-transitory computer readable storage media comprising instructions that when executed configure hardware processing circuitry to perform operations comprising:
for each of a plurality of access points (APs) in a wireless network, in response to determining that one or more signal strength measurements between the AP and one or more other APs of the plurality of APs satisfies a signal strength threshold, identifying, by a processor, each of the one or more other APs as a strong neighbor AP; and
inhibiting transmission, by the processor, by one or more APs of the plurality of APs having more than a threshold number of strong neighbor APs, wherein the threshold number of strong neighbor APs is a number greater than one; wherein inhibiting transmission by the one or more APs comprises iteratively inhibiting transmission by the one or more APs having more than the threshold number of strong neighbor APs until no AP of the plurality of APs has more than the threshold number of strong neighbor APs.

18. The non-transitory computer readable storage media of claim 17, the operations further comprising:
inhibiting transmission by a second AP of the plurality of APs having more than the threshold number of strong neighbor APs after inhibiting transmission by the first AP of the plurality of APs.

* * * * *

UNITED STATES PATENT AND TRADEMARK OFFICE
CERTIFICATE OF CORRECTION

PATENT NO. : 11,812,275 B2
APPLICATION NO. : 17/445559
DATED : November 7, 2023
INVENTOR(S) : Wenfeng Wang Page 1 of 1

It is certified that error appears in the above-identified patent and that said Letters Patent is hereby corrected as shown below:

In the Claims

Column 20, Line 35 (Claim 1): Replace "inhibiting transmission, by one" with -- inhibiting transmission, by the processor, by one --

Signed and Sealed this
Eleventh Day of February, 2025

Coke Morgan Stewart
*Acting Director of the United States Patent and Trademark Office*